US012309240B2

United States Patent
Worner et al.

(10) Patent No.: US 12,309,240 B2
(45) Date of Patent: May 20, 2025

(54) SYSTEM AND METHOD FOR MANAGING AND DISTRIBUTING INFORMATIONAL CONTENT ACROSS DISPARATE SYSTEMS

(71) Applicant: United States Postal Service, Washington, DC (US)

(72) Inventors: Roger Worner, Saint Peters, MO (US); Jason Alan Tamayo, St. Augustine, FL (US)

(73) Assignee: United States Postal Service, Washington, DC (US)

( * ) Notice: Subject to any disclaimer, the term of this patent is extended or adjusted under 35 U.S.C. 154(b) by 1 day.

(21) Appl. No.: 17/816,588

(22) Filed: Aug. 1, 2022

(65) Prior Publication Data

US 2022/0368778 A1 Nov. 17, 2022

Related U.S. Application Data

(62) Division of application No. 16/746,546, filed on Jan. 17, 2020, now Pat. No. 11,405,485.
(Continued)

(51) Int. Cl.
*H04L 67/60* (2022.01)
*G06F 3/14* (2006.01)
(Continued)

(52) U.S. Cl.
CPC ............ *H04L 67/60* (2022.05); *G06F 3/1454* (2013.01); *G06N 20/00* (2019.01); *H04L 43/16* (2013.01); *H04L 67/10* (2013.01)

(58) Field of Classification Search
None
See application file for complete search history.

(56) References Cited

U.S. PATENT DOCUMENTS 6,147,601 A * 11/2000 Sandelman ............ G08B 25/08
340/539.18
8,988,232 B1 * 3/2015 Sloo ...................... G08B 29/185
340/602
(Continued)

FOREIGN PATENT DOCUMENTS

SG 10201609396 A1 * 6/2018
WO WO-2016108047 A1 * 7/2016 ........... G08B 25/006

*Primary Examiner* — Schquita D Goodwin
*Assistant Examiner* — Ishrat Rashid
(74) *Attorney, Agent, or Firm* — Knobbe, Martens, Olson & Bear LLP

(57) ABSTRACT

A content management system for customizing and controlling data distribution is disclosed. Data items can be customized and dispersed to disparate reception terminals according to various control mechanisms where they can convey relevant information to local or remote stakeholders. Data items can be integrated into existing data distribution structures in real time according to applicable control mechanisms and distribution protocols. Data resources can be efficiently used in distributing data under predefined and configurable conditions. Control mechanisms and distribution protocols can be determined based on an interested user's recognized status within the system. Design of the distribution system allows for informed delivery of essential information in a controlled and automated fashion such that users can interact with the system in receiving or distributing current and relevant information across the distribution network for others to access.

20 Claims, 11 Drawing Sheets

Related U.S. Application Data

(60) Provisional application No. 62/793,660, filed on Jan. 17, 2019.

(51) Int. Cl.
  *G06N 20/00*  (2019.01)
  *H04L 43/16*  (2022.01)
  *H04L 67/10*  (2022.01)

(56) References Cited

U.S. PATENT DOCUMENTS

| | | | |
|---|---|---|---|
| 11,016,717 B1* | 5/2021 | Muthukrishnan | H04L 65/60 |
| 2003/0160734 A1* | 8/2003 | Rogers | G06Q 30/02 |
| | | | 345/2.1 |
| 2005/0261928 A1* | 11/2005 | Skeadas | G06Q 30/02 |
| | | | 705/26.1 |
| 2007/0294594 A1 | 12/2007 | King et al. | |
| 2009/0083676 A1* | 3/2009 | Flanagan | G06F 16/248 |
| | | | 715/853 |
| 2009/0207731 A1 | 8/2009 | Carlson et al. | |
| 2016/0282828 A1* | 9/2016 | Jauquet | G07C 9/28 |
| 2016/0292406 A1* | 10/2016 | Gandhi | G06F 21/32 |
| 2017/0124157 A1 | 5/2017 | Keohane et al. | |
| 2019/0333479 A1 | 10/2019 | Maalouf et al. | |
| 2019/0354420 A1* | 11/2019 | Venkatesan | G06F 11/0751 |

* cited by examiner

SYSTEM AND METHOD FOR MANAGING AND DISTRIBUTING INFORMATIONAL CONTENT ACROSS DISPARATE SYSTEMS

CROSS-REFERENCE TO RELATED APPLICATIONS

This application is a divisional of U.S. application Ser. No. 16/746,546, filed Jan. 17, 2020, entitled "SYSTEM AND METHOD FOR MANAGING AND DISTRIBUTING INFORMATIONAL CONTENT ACROSS DISPARATE SYSTEMS," which claims the benefit of U.S. Provisional Application Ser. No. 62/793,660, filed Jan. 17, 2019, entitled "SYSTEM AND METHOD FOR MANAGING AND DISTRIBUTING INFORMATIONAL CONTENT ACROSS DISPARATE SYSTEMS," which is hereby incorporated by reference in its entirety and for all purposes.

FIELD

This disclosure relates to systems and methods for the management and distribution of informational content across disparate systems.

DESCRIPTION OF THE RELATED TECHNOLOGY

Informational content, such as text, video, audio, and the like, may be created, manipulated and distributed to end-user devices across a network.

SUMMARY

In a first aspect, a system for presenting content in one or more facilities is described. The system comprises a plurality of displays configured to display a data set comprising a plurality of data items, at least one computing device, and a system server. The at least one computing device is configured to receive a request comprising one or more identifiers corresponding to one or more displays of the plurality of displays and a requested modification to the data set displayed on the one or more displays, and transmit the request. The system server comprises one or more processors and memory storing computer-executable instructions that, when executed by the one or more processors, cause the one or more processors to at least receive the request from the at least one computing device, determine a user hierarchy status associated with the request based at least in part on an identity of the at least one computing device or a user associated with the at least one computing device, determine a hierarchy status threshold corresponding to the request, compare the user hierarchy status to the hierarchy status threshold to determine whether the user hierarchy status meets the hierarchy status threshold, select between a modified version or an unmodified version of the data set based on whether the user hierarchy status meets the hierarchy status threshold, and cause the one or more displays to display the selected version of the data set.

In some embodiments, the one or more processors determine the hierarchy status threshold based at least in part on individual hierarchy statuses associated with the one or more displays or individual hierarchy statuses associated with facilities in which the one or more displays are located.

In some embodiments, the one or more processors determine the hierarchy status threshold using a machine learning model.

In some embodiments, the computer-executable instructions cause the one or more processors to select the modified version of the data set when the user hierarchy status is greater than or equal to the hierarchy status threshold and to select the unmodified version of the data set when the user hierarchy status is less than the hierarchy status threshold.

In some embodiments, selecting the modified version of the data set further comprises modifying the data set in accordance with the request.

In some embodiments, the computer-executable instructions further cause the one or more processors to at least determine that the user hierarchy status does not meet the hierarchy status threshold, modify the request by excluding at least one of the one or more identifiers corresponding to displays associated with a hierarchy status higher than the user hierarchy status, determine an updated hierarchy status threshold less than or equal to the user hierarchy status, and select the modified version of the data set based on the modified request.

In some embodiments, the requested modification comprises adding a data item to the data set, and wherein the computer-executable instructions further cause the one or more processors to delay transmission of the data item to a target transmission period associated with expected high transmission resource availability.

In a second aspect, a method for presenting content in one or more facilities comprises receiving a request from a first computing device at a system server, the request comprising a requested modification to a data set displayed on one or more displays; determining a user hierarchy status associated with the request; determining a hierarchy status threshold corresponding to the request; comparing the user hierarchy status to the hierarchy status threshold to determine whether the user hierarchy status meets the hierarchy status threshold; selecting between a modified version or an unmodified version of the data set based on whether the user hierarchy status meets the hierarchy status threshold; and causing the one or more displays to display the selected version of the data set.

In some embodiments, the requested modification comprises the addition, modification, or removal of one or more data items in the data set.

In some embodiments, the requested modification comprises adding a data item to the data set, the method further comprising determining that transmission of the data item is associated with a file size or a bandwidth requirement that exceeds a predetermined resource threshold, selecting a target transmission period based on an expected period of higher transmission resource availability, and transmitting, to the first computing device, a notification including an identification of the selected target transmission period.

In some embodiments, the user hierarchy status is determined based at least in part on an identification credential provided by a user of the first computing device.

In some embodiments, determining the hierarchy status threshold corresponding to the request comprises identifying the one or more displays based at least in part on one or more identifiers included in the request, determining individual hierarchy statuses corresponding to facilities in which the one or more displays are located, and selecting a highest hierarchy status of the determined individual hierarchy statuses.

In some embodiments, when the user hierarchy status is determined not to meet the hierarchy status threshold, the method further comprises modifying the request by excluding at least one of the one or more identifiers corresponding to displays associated with a hierarchy status higher than the user hierarchy status, determining an updated hierarchy status threshold less than or equal to the user hierarchy status, and selecting the modified version of the data set based on the modified request. In some embodiments, when the user hierarchy status is determined not to meet the hierarchy status threshold, the method further comprises determining that each of the individual hierarchy statuses is higher than the user hierarchy status, selecting the unmodified version of the data set, and transmitting, to the first computing device, a notification that the request was denied.

In a third aspect, a method of monitoring equipment status in a distributed environment comprises receiving, at a system server, a request from a first computing device associated with a first facility, the request comprising an operational status indicator corresponding to a condition at the first facility; determining an escalation parameter corresponding to the operational status indicator, the escalation parameter comprising a threshold time period; modifying a first data set displayed on a first display at the first facility based on the operational status indicator; determining that the threshold time period has elapsed; identifying a second data set displayed on a second display at a second facility; and modifying the second data set to cause the second display to display the operational status indicator.

In some embodiments, the operational status indicator comprises an indication of a health or operational status of a piece of equipment located at the first facility.

In some embodiments, the request further comprises a condition time period for which the condition has been present, and the threshold time period is determined to have elapsed based on a beginning of the condition time period.

In some embodiments, modifying the first data set comprises at least one of adding the operational status indicator to the first data set or adding an alert to the first data set based on the operational status indicator.

In some embodiments, the second data set is identified based at least in part on the second facility being directly above the first facility within an organizational hierarchy.

In some embodiments, the method further comprises modifying the escalation parameter by increasing or decreasing the threshold time period, the method further comprising escalating the condition to a third facility having a higher hierarchy status relative to the second facility when the increased or decreased threshold time period elapses following the modification of the escalation parameter.

BRIEF DESCRIPTION OF THE DRAWINGS

The foregoing and other features of the disclosure will become more fully apparent from the following description and appended claims, taken in conjunction with the accompanying drawings.

DETAILED DESCRIPTION

Figure 1:
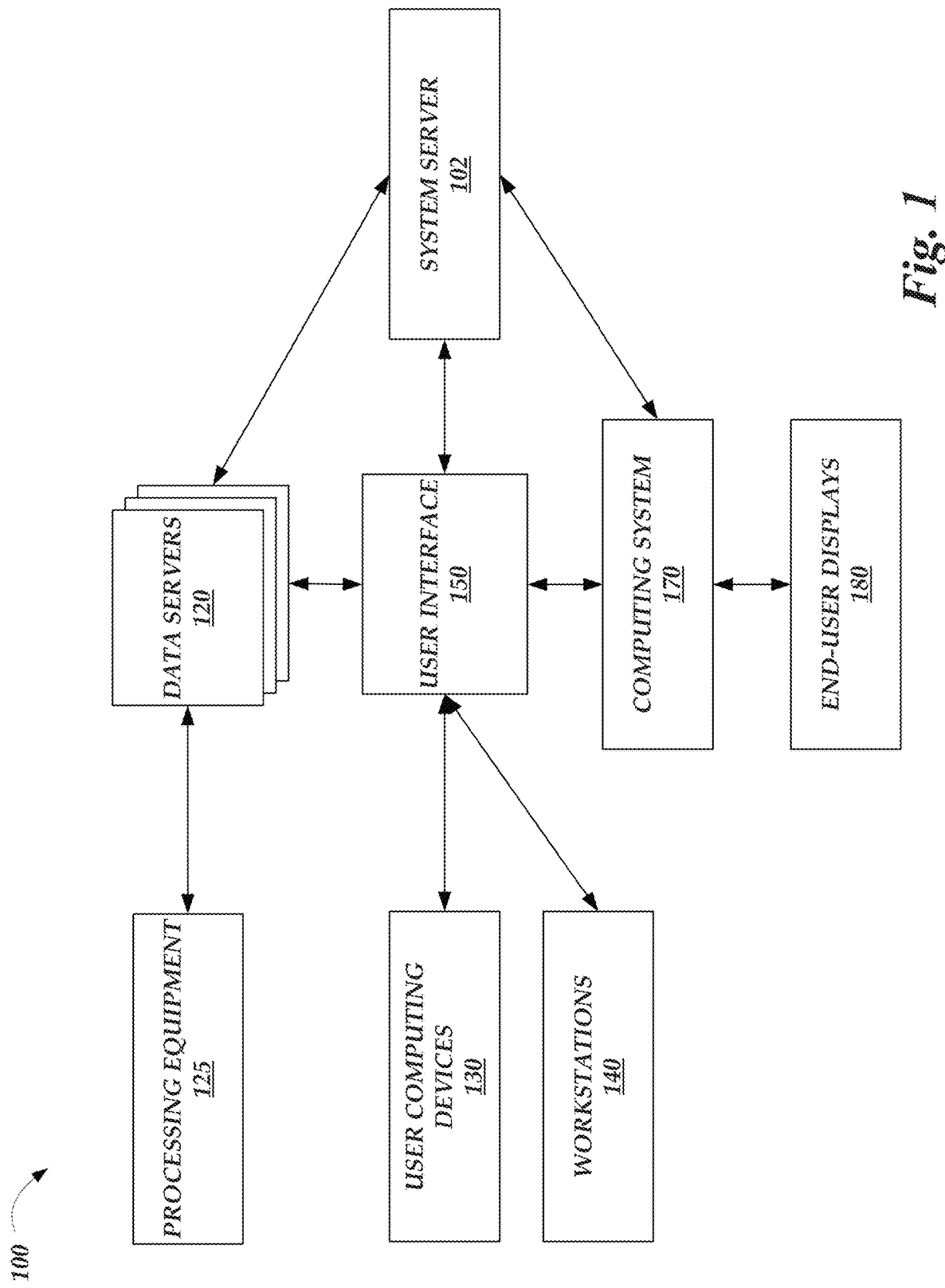
FIG. 1 is a block diagram of an embodiment of a content management system implemented in a distribution network.

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the disclosed technology. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

A content management system generally facilitates and controls distribution of content across a network. The content management system transfers data items from data servers or content generators to end points such as reception terminal devices or end-user devices according to specific rules. In some embodiments, the end points comprise end-user displays or monitors configured to display content on a viewing screen (e.g., computer or television monitor).

In some embodiments, the monitors may be stationed at various locations for a facility or an organization and may be fed data from a data server for continuous or at least semi-continuous content display. For example, the monitors may be displaying a video with audio or a slideshow where a new slide is displayed automatically according to preconfigured settings for each slide. In some embodiments, each slide of a slideshow may comprise multiple data items pulled from one or more data server(s) and displayed in a customizable configuration. For example, more than one discrete data item may be presented in a single slide.

In some embodiments, a facility or organization may have hierarchy levels and subhierarchy levels. As an example hierarchy description, a CEO, a senior staff member and junior staff members may work at a headquarters, supervisors and employees may work at a district facility having a lower hierarchy level relative to the headquarters, and supervisors and employees may work at a local facility within a district having a lower hierarchy level relative to the district facility. In this example, the hierarchy may be configured in terms of facilities (e.g., headquarters, district, local in descending order), in terms of personnel (e.g., CEO, senior staff member, junior staff member, supervisor, employees in descending order), or both (e.g., supervisor of local facility may have a higher hierarchy status than an employee of the district facility). In some embodiments, a supervisor at a building with a lower hierarchy may have priority over an employee working from a building having a higher hierarchy. In yet another embodiment, certain facilities may have the same hierarchy level such as a plurality of district facilities or a plurality of local facilities. A person skilled in the art will understand these are only examples and that a hierarchy within a company or organization can be defined in any number of ways.

The systems and methods described herein allow, inter alia, configurability of content displayed on some or all display monitors connected to a network via a user interface that intuitively and automatically determines a type of data request, for example, either to access or view data and/or to upload data to a monitor for display. According to embodiments of this disclosure, the data displayed on the monitors may be stored in data servers where the data is then transmitted to the display devices according to specific distribution rules. In this way, a single data item can be transmitted from a data server to multiple display devices without resulting in duplicative storing in the data server. According to specific distribution rules, the system may display customized information on display devices according to the intended audience of the displayed information.

Customizing the data displayed to an intended audience is also controlled based on a user's identifiable hierarchy status such that an unauthorized user is not able to distribute information to certain viewing monitors. For example, an employee at a district facility may be blocked from distributing certain content to monitors at a different district facility on the same hierarchy level, but may be able to view the content that is being displayed on a monitor for that same facility based on the configuration of the control system.

In another embodiment, information regarding the condition of a facility, equipment, location or entity may be displayed on an end-user display and accessed by a user computing device 130 or workstation 140. The condition may be related to the system health of a machine, such as mail processing equipment (MPE), at the location, or otherwise some type of alert that an entity (e.g., a supervisor, manager or CEO) may be interested in. The condition may be initially displayed on one or more monitors at locations where the condition is most relevant. For example, if a service vehicle associated with Plant A is undergoing maintenance, the display or displays at Plant A may display this information. An escalation algorithm may be provided such that the condition, upon the triggering of an escalation event, may automatically cause the condition to display on an end-user display associated with Plant B, where Plant B may be on the same or a higher level than Plant A. Similarly, once another triggering event occurs, the data may be escalated again to Plant C. For example, the escalation trigger may be programmed such that after two weeks, the condition escalates to Plant B, but after a different number of weeks, the condition escalates to Plant C. In some instances, certain locations may require rules for escalation of certain conditions that differ from the rules for another location for the same condition. For example, a facility in a suburban location where a condition may be displayed at the suburban location, may not escalate according to the same schedule as that for the same condition in a rural location, since the operating conditions might differ for the two.

In another embodiment, the distribution of certain types of data may be delayed or scheduled for managing resource allocation. For example, a video stream to a display device may be determined to be resource intensive and thus, may be delayed for a period of time when data traffic slows (e.g., non-peak hours). During that time, the video may be transmitted (uploaded) to the computing system 170 for downloading to devices or downloaded to display devices 180 for playing.

Certain embodiments of the disclosure will now be described in connection with the figures. The figures are meant to aid in understanding the disclosed technology and only provide example embodiments. Other embodiments may be implemented in accordance with the disclosure herein and appended claims. In the interest of brevity, only a sample of such embodiments will now be described.

FIG. 1 is a block diagram illustrating an exemplary content-management computing environment 100. As shown, the exemplary computing environment 100 may include system servers 102, data servers 120, processing equipment 125, user computing devices 130, workstations 140, a user interface 150, computing system 170, and end-user displays 180. In some embodiments, the system servers 102 may comprise a central computer or software application on a central computer configured to receive data instructions, perform computing tasks, and provide data to other computers. In some embodiments, system server 102 comprises a series of interconnected computers comprising one or more communication networks. A communication network may be a publicly accessible network of linked networks, possibly operated by various distinct parties, such as the Internet. In other embodiments, the communication network may include a private network, personal area network, local area network, wide area network, cable network, satellite network, cellular telephone network, peer-to-peer network, etc. or a combination thereof, some or all of which may or may not have access to and/or from the Internet. For example, the system server 102 may be associated with a cloud network. In addition, system server 102 may comprise machine learning or artificial intelligence software configured to perform any of the higher level functionality described herein (e.g., determining thresholds, distribution protocols, feasibility levels, etc.).

Data servers 120 comprise any database or data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values ("CSV") files, eXtendible markup language ("XML") files, TeXT ("TXT") files, flat files, spreadsheet files, and/or any other format for data storage. Databases are typically stored in one or more data stores. Accordingly, each database referred to herein (e.g., in the description herein and/or the figures of the present application) is to be understood as being stored in one or more data stores. In some embodiments, data server 120 and system server 102 may be implemented as a single entity. In a non-limiting example, data server 120 may comprise a single-node database server, such as an Oracle server. In another non-limiting example, data server 120 may comprise a dedicated video server configured to transmit video files to specified devices during a predetermined time (e.g., a non-peak hour or hours).

Accordingly, a data server 120 may store a plurality of data items and/or sets of data items. Furthermore, a single data set in data server 120 may comprise multiple data items as part of that set. For example, a data set may include a string of data items, assembled together in a packaged form. In other embodiments, a data set may include instructions identifying specific data items stored on one or more other data servers 120 that system server 102 may access when assembling the data set. In some embodiments, a data set may include a slideshow or other data structure configured to provide informational content to a user via a presentation medium (e.g., speakers, display screens, etc.). For example, a slideshow may include an audio file, image file, video file, or a data set combination thereof. In addition, a slideshow or data set may include a cyclical presentation of content, such that the same set of data items are repeated at each cycle. The discrete components of a slideshow may be referred to as data items.

In a non-limiting example, a data set may comprise a slideshow, for example, made up of three data items or slides. According to some embodiments, an end-user display 180 or user computing device 130 may access the data set to view or manipulate the three-slide slideshow as a single data set or may view or manipulate the data items that comprise the data set individually (e.g., the three slides). In some instances, the determination as to what level of access is afforded a particular user will depend on the hierarchy status of the user and/or the distribution information associated with the data specified at the time of upload or distribution. For example, where one of the data items (e.g., an individual slide) is not slated for distribution to one of the end-user displays 180, the end-user may still be able to access the full three-slide slideshow but may be restricted to viewing or manipulating only two of the slides. In such an example, the three-slide slideshow or the three slides individually still need only be stored once on the data server 120. When the restricted user attempts to access the three-slide slideshow, system server 102 may access the entire three-slide slideshow, but may only provide the user with access to view or modify two of the slides or alternatively, may only access the two relevant slides that are part of the three-slide slideshow as separate data items from a full data set. This aspect promotes efficient data storage and management as it allows system server 102 to avoid creating a separate instance of the two slides for the user that lacks the access privileges to view or modify the third slide of the three-slide slideshow, and instead maintain one copy of the three-slide slideshow on data server 120, one copy of each individual slide on data server 120, or a combination thereof.

When a slideshow is slated for display, each slide may be transmitted to computing system 170 individually. Alternatively, a full data set may be transmitted. In such embodiments, system server 102 and data server 120 may coordinate efforts to assemble the data into the configuration selected by the user via user interface 150 such that the displayed content reflects the proper arrangement without the content necessarily being stored on the computing system 170 and without multiple copies of the data item needing to be stored on a data server 120.

Processing equipment 125 comprises equipment within a facility or organization that is primarily configured to assist in the functioning of the facility or organization. For example, processing equipment 125 may refer to computers, assembly equipment, printers, conveyor systems, forklifts, and/or other machines utilized to achieve a certain goal. In the example of a mail room facility, where the disclosed technology may be implemented, an example processing equipment 125 may include mail processing equipment ("MPE"). The processing equipment 125 may be configured to transmit data, such as diagnostic data and/or status data (e.g., maintenance status, operational status, etc.), to a data server 120, either wirelessly or otherwise. Similarly, system server 102 may transmit information to the processing equipment 125, such as data related to the health of other similarly situated processing equipment 125 or an escalation status for equipment known to be experiencing an adverse health condition (e.g., indication as to how the health of the equipment is being treated in view of various escalation parameters applied).

A user computing device 130 may be a phone, laptop, desktop computer, tablet, etc. The user computing devices 130 may be personal computers for individual usage. Workstations 140 may be dedicated computing devices, such as a phone, laptop, desktop computer, tablet, for access from multiple users. In some instances, a user computing device 130 may be tethered to a workstation 140 via a hotspot Wi-Fi network or vice versa. The user computing devices 130 and/or workstation 140 may be identified by IP addresses, network configuration information (e.g., VPN information, etc.), or a device's physical coordinates as indicated by GPS or some other location indicator.

The user computing devices 130 and/or workstation 140 may require authorization to access or modify data stored on the network (e.g., stored on data server 120, system server 102, computing system 170, etc.). For example, a user may be required to provide a username, password, biometric information, or some other identifying information before accessing portions of the user interface 150 and/or proceeding through a navigational structure of the user interface 150. In addition, a user may be required to provide verification information at multiple predefined access points. Furthermore, each access point may require varying degrees of authorization to gain access and proceed through the navigational structure. In a non-limiting example, an employee of a company might have permission to view certain content available on the network but may not have permission to upload content to the network or may have limited privileges to upload content based on their hierarchy status within an organization. For example, based on the user's hierarchy status, the user may only be able to upload and push content to devices or device groups that are associated with the same hierarchy level or a lower hierarchy level, but may be restricted from uploading and pushing content to a device or device group that is at a higher hierarchy level. A user may define how the content is to be distributed by providing distribution information via the user interface 150 according to certain embodiments described herein. In some embodiments, a user can share a slideshow with a higher level where it can be viewed and acted upon by a higher level user (e.g., modified, displayed, etc.) or discarded.

In one example embodiment, a user computing device 130 may be a mobile device such as a tablet, operated by a facility supervisor. The supervisor may log in to the user computing device 130 using a credential or biometric authentication, as described above. While the supervisor is logged in, the supervisor may request to mirror or extend the screen of the user computing device 130 or a display a selected portion of the screen, or display selected information onto one or more of the end-user displays 180 located at the facility. In some embodiments, the supervisor may only be authorized to display a particular set or subset of screens or information (e.g., the supervisor may only be authorized to display information or screens from one or more specified applications installed on the mobile device). In one example, the user interface 150 only accepts content from a single specified widget or app authorized to interact with the computing system 100. The authorized app or widget may be configured to allow the user to display information such as a picture of the current information displayed on the mobile device (e.g., in a postal implementation, an amount of mail on hand, employee availability, mail volume, productivity, etc.) and/or a photo taken with a camera embedded within the mobile device. The user computing device 130 and/or the user interface 150 may be configured to determine one or more display permissions based on the supervisor's login status and/or location. Display permissions may include, for example, which application screens the user is authorized to display, which end-user displays 180 the user is authorized to display some or all screens to, or any other content restrictions, based on the user's login status and the facility or the location within a facility of the mobile device.

User interface 150 may be a graphical user interface ("GUI") or interactive user interface. A user interface 150 may comprise one or more software programs stored in memory. User interface 150 may comprise a plurality of individual pages. Each page of the user interface 150 may solicit or provide specific information to a user and provide navigation to other pages based on user actions. The user interface 150 is configured to receive inputs and generate outputs according to program instructions.

In some embodiments, the user interface ("UI") 150 may be displayed on a screen, such as a touch-enabled display or a non-touch-enabled display, such as a monitor, video panel, television screen, augmented or virtual reality-enabled goggle display, etc. For example, the user interface 150 may be displayed on a smart phone or tablet such that a user may interact with the user interface 150 via a touch selection. Additionally, the user interface 150 may provide fillable fields for accepting text input. The user interface 150 may also accept other files such as audio, video or text based files.

User interface 150 may be accessed via a web browser (e.g., Chrome, Internet Explorer, Firefox, Safari, etc.). For example, the software instructions underlying the UI 150 may be stored on data server 120 or system server 102. In such embodiments, a link may be used to access the user interface 150 via the web browser from a device (e.g., user computing devices 130 and/or workstations 140) with access to the particular location storing the UI 150 software instructions (e.g., stored on data server 120, system server 102, etc.). Alternatively, the UI 150 may be launched as a software application preconfigured on a networked device. For example, the user interface 150 software application may be preconfigured on a workstation computer 140 or on a user computing device 130. In such embodiments, the application may be launched directly from the memory of the workstation computer or user computing device 130. A person skilled in the art will appreciate that UIs may be accessed from and rendered on devices in different ways, including as described above as a hybrid thereof (e.g., instructions stored locally on a user device and enhanced using data or additional instructions stored on a separate server), etc. An example user interface 150 will be described with reference to FIGS. 3A-3D.

Computing environment 100 may include a computing system 170 configured to serve as an intermediary device between an end-user display 180 and other computing devices of the computing environment 100. For example, computing system 170 may communicate information from the system server 102, user computer device 130, data server 120 or processing equipment 125 to an end-user display 180 for display. A computing system 170 may be configured to programmatically push data to an end-user display 180 at appropriate time intervals for display. In other instances, computing system 170 may passively facilitate the flow of information to and from an end-user display 180 with system server 102 providing the control for when certain data should be queued for display. A person skilled in the art will appreciate that a computing system 170 may also be configured to monitor user interactions with an end-user display 180 and transmit information related to those interactions to one of the other devices for further processing (e.g., system server 102). Computing system 170 may be a configurable device capable of receiving data wirelessly from a network or other computing device (e.g., a mini PC, PC stick dongle, etc.). For example, computing system 170 may be a Bluetooth dongle or Wi-Fi dongle configured to receive data, process data, and transmit data to another device. Alternatively, the computing system 170 may be connected via an Ethernet cable to a LAN network. In a non-limiting example, the operating environment for computing system 170 may be an Advanced Computing Environment ("ACE"). In addition, computing system 170 may be supported by Raleigh Desktop Computing group.

In addition, a number of end-user displays 180 may be provided. The end-user displays 180 may include any device configured to display content including a television monitor, a computer monitor, a handheld monitor, etc. The end-user display 180 may be coupled to a computing system 170 such that computing system 170 may receive data and transmit the data to the end-user display 180. In other embodiments, end-user display 180 may have a computing system 170 built into the display device itself such that an external computing system 170 is unnecessary. In some embodiments, end-user displays 180 may be removably or fixedly attached to a support structure. For example, end-user display 180 may be a television monitor mounted to a wall. In addition, end-user displays 180 may be located at various locations within or outside a facility. A number of end-user displays 180 may be customer facing (e.g., mounted such that customers may view the displayed content), employee facing (e.g., mounted in the back of a storeroom for employees to view), or both. In some embodiments, the data displayed on each display 180 may depend on whether the device is designated as customer facing, employee facing, or both. For example, internal data statistics, system alerts, or facility conditions of a company may not be displayed on a customer facing monitor. In addition, multiple end-user displays 180 may be located at multiple different facility or organization sites, but with a single system server 102, located remotely or at one of the sites, interfacing with each of the displays (via computing system 170 or otherwise). The single system server 102 may be located remotely or at one of the facility or organization sites. For example, a common system server 102 may be located at the headquarters facility and connect to end-user displays located at other facilities across the nation. Accordingly, a single system server 102 may interface with each of a multitude of end-user displays 180 or computing systems 170. Likewise, a single computing system 170 may be configured to interface with multiple end-user displays 180.

In addition, the end-user display 180 may have touch-screen functionality, such that a user can interact with the data on screen depending on how the display data is configured. For example, certain items displayed on the end-user display 180 may be selectable, such that additional content may be accessed from the end-user display 180. In some embodiments, the end-user display 180 may be included as part of a user computing device 130 or workstation 140, such that a user may view the display data from a device that is also configured to access the user interface 150 (e.g., a mobile user computing device 180).

Additionally, the user computing devices 130, workstations 140, data servers 120, processing equipment 125, system servers 102, computing system 170 and end-user displays 180 may communicate with each other via one or more communication networks. In addition, end-user display 180 and/or computing system 170 may be configured to communicate with data server 120 directly.

Figure 2:
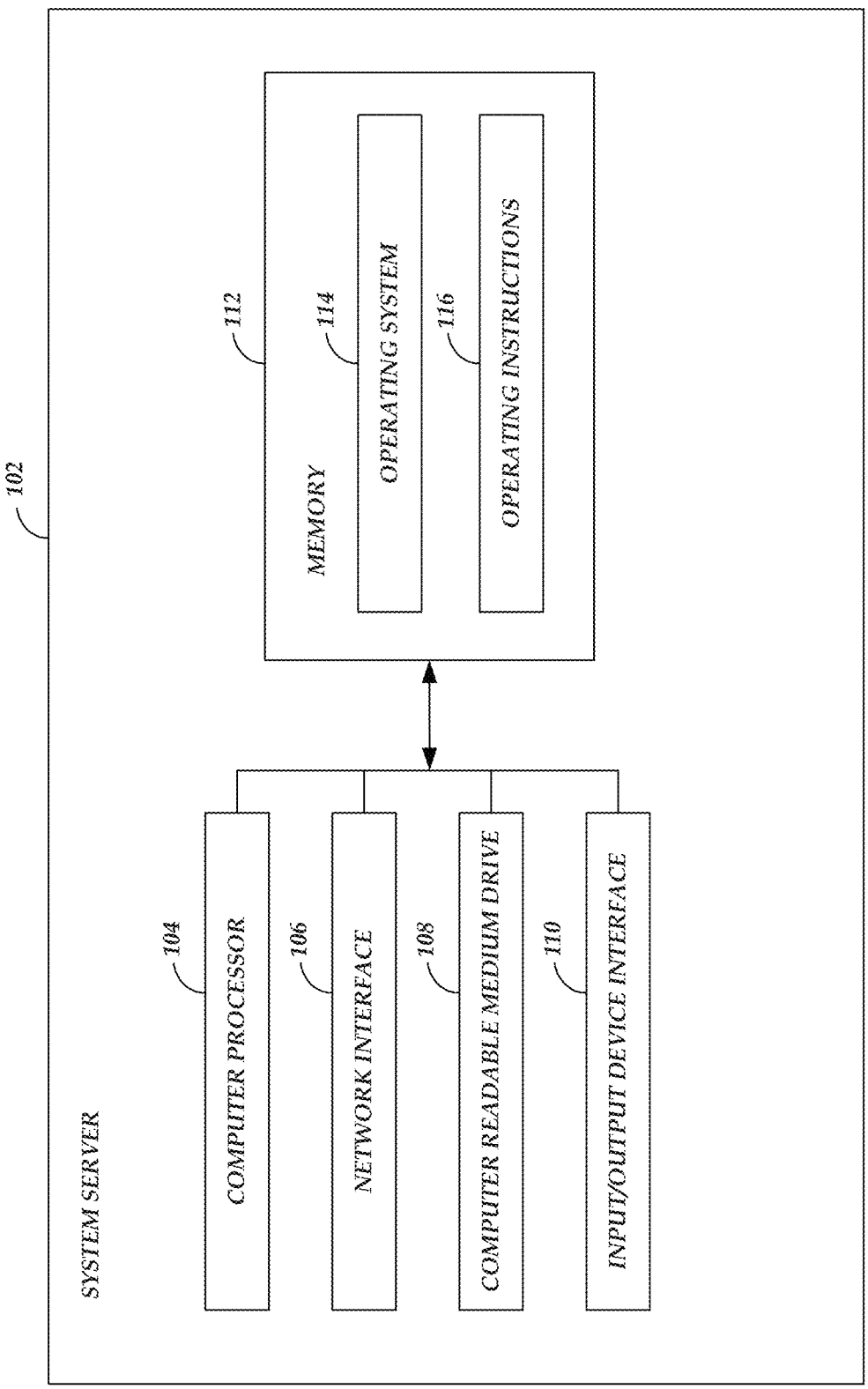
FIG. 2 is a block diagram of an illustrative computing device configured to implement protocol identification and data item processing according to some embodiments.

FIG. 2 illustrates an example system server 102 configured to execute the processes and implement the features described above in connection with, e.g., the systems, interfaces and/or the devices of FIG. 1. In some embodiments, the computing system 102 may include: one or more computer processors 104, such as physical CPUs; one or more network interfaces 106, such as a network interface cards ("NICs"); one or more computer readable medium drives 108, such as high density disk drives ("HDDs"), solid state drives ("SDDs"), flash drives, and/or other persistent non-transitory computer-readable media; an input/output device interface 110, such as an IO interface in communication with one or more external storage drives; and one or more computer readable memories 112, such as RAM and/or other volatile non-transitory computer-readable media.

The network interface 106 can provide connectivity to one or more networks or computing systems, such as a data server 120. The computer processor 104 can receive information and instructions from other computing systems or services via the network interface 106. The network interface 106 can also store data directly to the computer-readable memory 112. The computer processor 104 can communicate to and from the computer-readable memory 112, execute instructions and process data in the computer readable memory 112, etc.

The computer readable memory 112 may include computer program and/or operating instructions that the computer processor 104 executes in order to implement one or more embodiments. The computer readable memory 112 can store an operating system 114 that provides computer program instructions for use by the computer processor 102 in the general administration and operation of the computing system 100. The computer readable memory 112 can further include operating instructions 116, such as computer program instructions and other information for implementing aspects of the present disclosure. For example, in one embodiment, the computer-readable memory 110 may include a set of data item processing instructions that, e.g., implement the content management and distribution operations of the process 400-700, described elsewhere herein. As another example, the computer-readable memory 112 may also include a set of hierarchal identification instructions that, e.g., implement the content management and distribution operations of one or more of processes 400-700 (as described herein with reference to FIGS. 4-7), manage the processes 400-700, etc.

In some embodiments, multiple computing systems may communicate with each other via their respective network interfaces 106 via a network, and can implement data storage or location and hierarchy-related features independently (e.g., each system server 102 may execute one or more separate instances of the processes 300-700), in parallel (e.g., each server, computing system 170, workstation 140 or user computing device 130 may execute a portion of a single instance of one or more of processes 300-700), etc. For example, a distributed computing environment may provide hosted capabilities for implementing the systems and methods described herein.

In addition, a person skilled in the art would understand that the data servers 120, computing devices 130, workstations 140, computing systems 170, and end-user displays may be configured similarly to the above description of system servers 102.

FIGS. 3A-3E illustrate example user interface pages, according to various embodiments of the present disclosure, which can be available on the user interface 150. A person skilled in the art will understand that FIGS. 3A-3E only show an example embodiment of a user interface, but that the user interface can take on different formats without departing from the spirit of the technology disclosed herein. Throughout the discussion of FIGS. 3A-3E, reference is also made to various components of the computing system 100 illustrated in FIGS. 1 and 2.

Figure 3A:
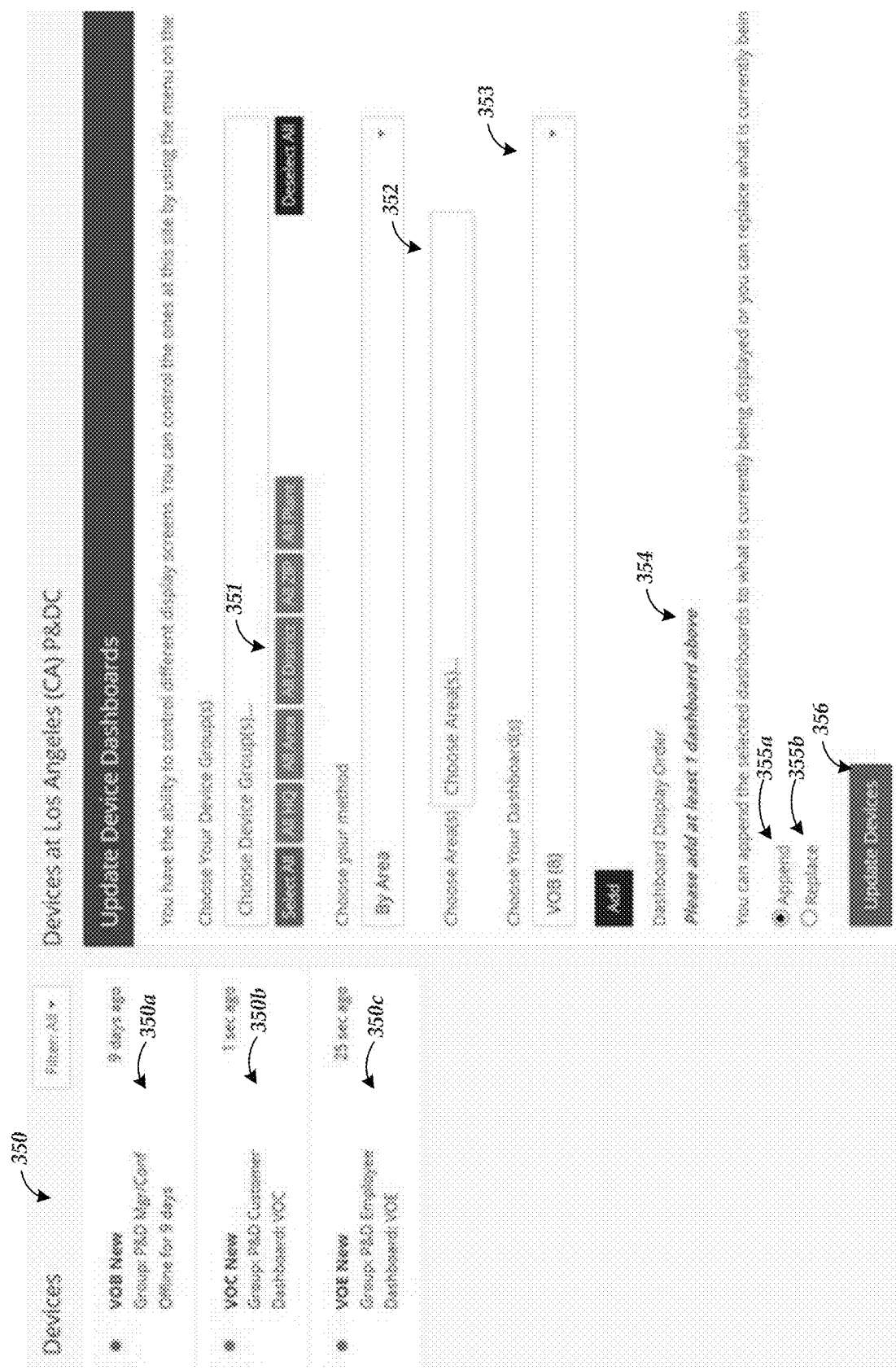
FIGS. 3A-3E are illustrative examples of aspects of a user interface, according to various embodiments of the present disclosure.

FIG. 3A provides an example illustration of a user interface layout for distributing content across a network. A user may access the user interface 150 via a user computing device 130. FIG. 3A allows for selection of a device group. In some embodiments, a device group may include a predetermined grouping of end-user displays 180. For example, each end-user display 180 may be categorized within one or more device groups 351 depending on various criteria, such as physical location, hierarchy, intended audience (e.g., employee, customer, etc.), etc. In the embodiment shown, a device group may be selected using one of the device group selectors 351 from a list based on hierarchy or physical location, such as "All HQ," "All Area," "All Region" (not shown), "All District," "All ZIP" or "All Plant." Intrinsic in this example of device groups is an identifiable hierarchy for the various groups. For example, HQ or headquarters may have a higher hierarchy status than an Area, an Area higher than a District, etc. In some embodiments, additional groups may be included. In other examples, device groups can be associated with a specific function, such as a retail store, and may be associated with a device group name of "All Retail Stores" in the organization's network. In a non-limiting example, a user may assign content (e.g., a slideshow, video, image or file to be integrated into an existing slideshow, etc.) to single or multiple devices, or to a single or multiple device group, at the same time from this page. A user may also specify sub-groups within a group. For example, an Area may be chosen using the selector 352 after choosing the "By Area" method as shown.

In some embodiments, the device groups are customizable. The customizable device groups can be User Defined Device Groups which are defined once and then available for any user at the site. User Defined Device Groups may also be shared with other sites at any hierarchy of the organization. A User Defined Device Group is characterized by the ability to create any subset of devices required by the user crossing all categories and hierarchies of devices under the direct authority of the user. In one example, site users may create a group of any devices at the site. Area users can create a group including one or more devices from any/all sites within the geographic confines of the area.

Continuing with reference to FIG. 3A, a user may select a dashboard for display in the dashboard selector 353. The left-hand side bar 350 shows example selectable dashboards VOB ("voice of the business") New 350*a*, VOC ("voice of the customer") New 350*b*, and VOE ("voice of the employee") New 350*c*. A dashboard may comprise an assembly of various content data items that have been packaged for display based on specific criteria. For example, a dashboard may include a slideshow, video, or other data item that is intended for display to a business, employee, or customer. In a non-limiting example, a dashboard may comprise a group of slides, including a video and audio, which have been developed and saved as a single dashboard item. In some instances, a particular dashboard may be designated to a specific device group. In other instances, a particular dashboard may be designated for a particular audience (e.g., customer, business, employee, etc.). In addition, a dashboard may include equipment status as received from one of the processing equipment 125. For example, a dashboard may be configured to include service or alert codes associated with a particular piece of processing equipment 125. Thus, a user may be able to specify which pieces of equipment data they would like included in a particular dashboard and also, a frequency at which the equipment data updates. For example, a user may only be interested in distributing a dashboard that updates a particular parameter pulled from the data server 120 at a specified frequency or may wish to present an average as determined over a period of time that updates at a specified frequency.

In some embodiments, a user may be able to manipulate the display order of a dashboard using an order selector 354. In addition, a new dashboard may be appended 355*a* to an existing dashboard slated for display on a device or devices within a device group. A person skilled in the art will understand that the nomenclature may be set by the user. In such embodiments, a dashboard may be added and the display order may be specified by the user. A user may then select to either append 355*a* the selected dashboard(s) to what is currently being displayed at the relevant end-user displays 180 or may choose to replace 355*b* what is currently being displayed based on the newly selected distribution information. Similarly, dashboards may be selected to be removed from all selected devices. A user may conclude their selection of distribution information by selecting the update devices button 356. Other options may exist in other embodiments. Once the user has made their selections, the user may select the "Update Devices" button 356 in the user interface, and as described herein, system server 102 may determine whether the request to update devices can be fulfilled, if further modifications to the request (e.g., data query) are necessary, or whether the request should be denied.

In an illustrative example, a user may select a device group of "All Area," using the relevant device group selector 351, which will identify all device groups at the area level (e.g., all end-user displays 180 associated with a facility or organization at the area level). A user may also select another device group, for example "All District," which will identify all device groups at that other level. In some embodiments, the user interface 150 may be configured such that selection of one device group will automatically include all device groups at that level and at a lower level according to the hierarchy status. Once a user selects a device group, one or more drop down menus are presented including an option to choose a distribution method. In some cases, a user may select to distribute content by area, by district, by zip, by plant, etc., the user may select to distribute by facility or organization type (e.g., all processing and distribution centers (P&DC) within a region, area, etc., or may choose to distribute by another method depending on how the user interface is configured. A user may then select, using the selector 352, the relevant area, districts, facility types, etc. that the user would like to include as part of the distribution information. Next, the user may select using dashboard selector 353, a dashboard that they would like to include as part of the distribution information. A user may select more than one dashboard for distribution, and reorder the dashboard using the order selector 354. A user may then select to either append the selected dashboard(s) to what is currently being displayed at the relevant end-user displays 180 or may choose to replace what is currently being displayed based on the newly selected distribution information. A user may conclude their selection of distribution information by selecting the update devices button 356.

Figure 3B:
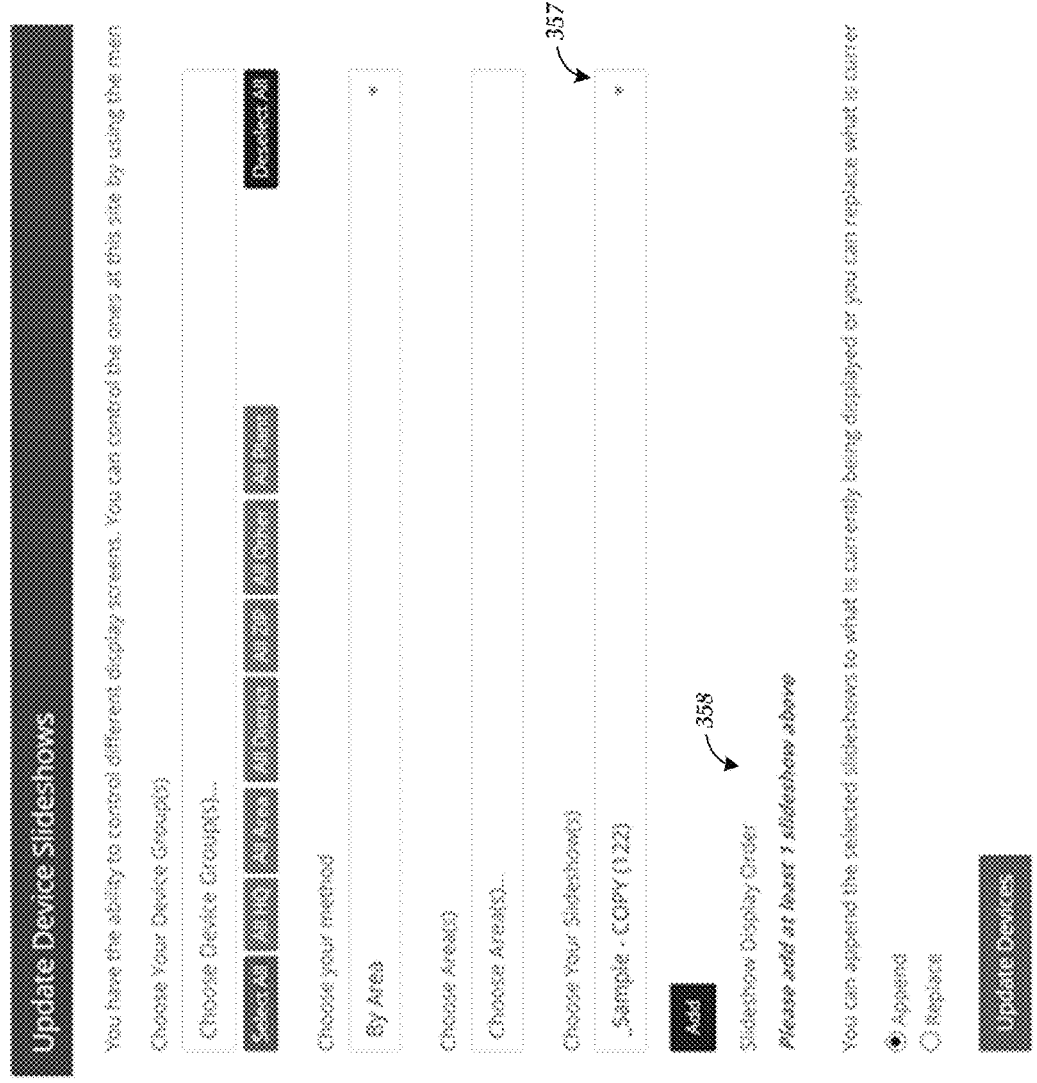

FIG. 3B provides another example embodiment of a screen of the user interface 150, where a user chooses one or more slideshows to include as part of the distribution information using slideshow selector 357, similar to the process for selecting a dashboard for display. A user may also customize, assemble, or otherwise create a slideshow offline and upload the slideshow for distribution. Creating a new slideshow may be part of a separate user interface screen and may allow a user to include a Uniform Resource Locator (URL) hyperlink that references a location on the web where the user has previously uploaded a slideshow or portions of a slideshow that they would like to distribute. Once added, the user may specify the display order for the slideshow using slideshow order selector 358. A user may also specify a layout for the content, time frames and durations. In other user interface pages (not shown), a user may preview all content currently included across the network. A user may also view the content as broken down by an expected function that the content relates to. A user may also view the condition of items within the system. For example, the user may view all or a subset of all active alerts according to specific rules of the system. In some embodiments, alerts will only be available for display in areas that meet a specified hierarchy status threshold (e.g., a manager or staff conference room) and may only be available to users with sufficient credentials as identified by the user's or a device's hierarchy status.

In some instances, a slideshow may provide cyclical data including individual data items that are each presented for a period of time before moving on to the next data item, whereas a dashboard may be configured to provide a stationary board of information, where only the individual data points within the dashboard change. The end-user display 180 may be configured to present both simultaneously. For example, a fixed dashboard panel may be presented on a screen with updating statistical figures and other data points and then a slideshow may be presented adjacent to it where the entire page or portions of the page (depending on the slide layout as described in FIG. 3D) are configured to change in a cycle according to certain embodiments described herein.

Figure 3C:
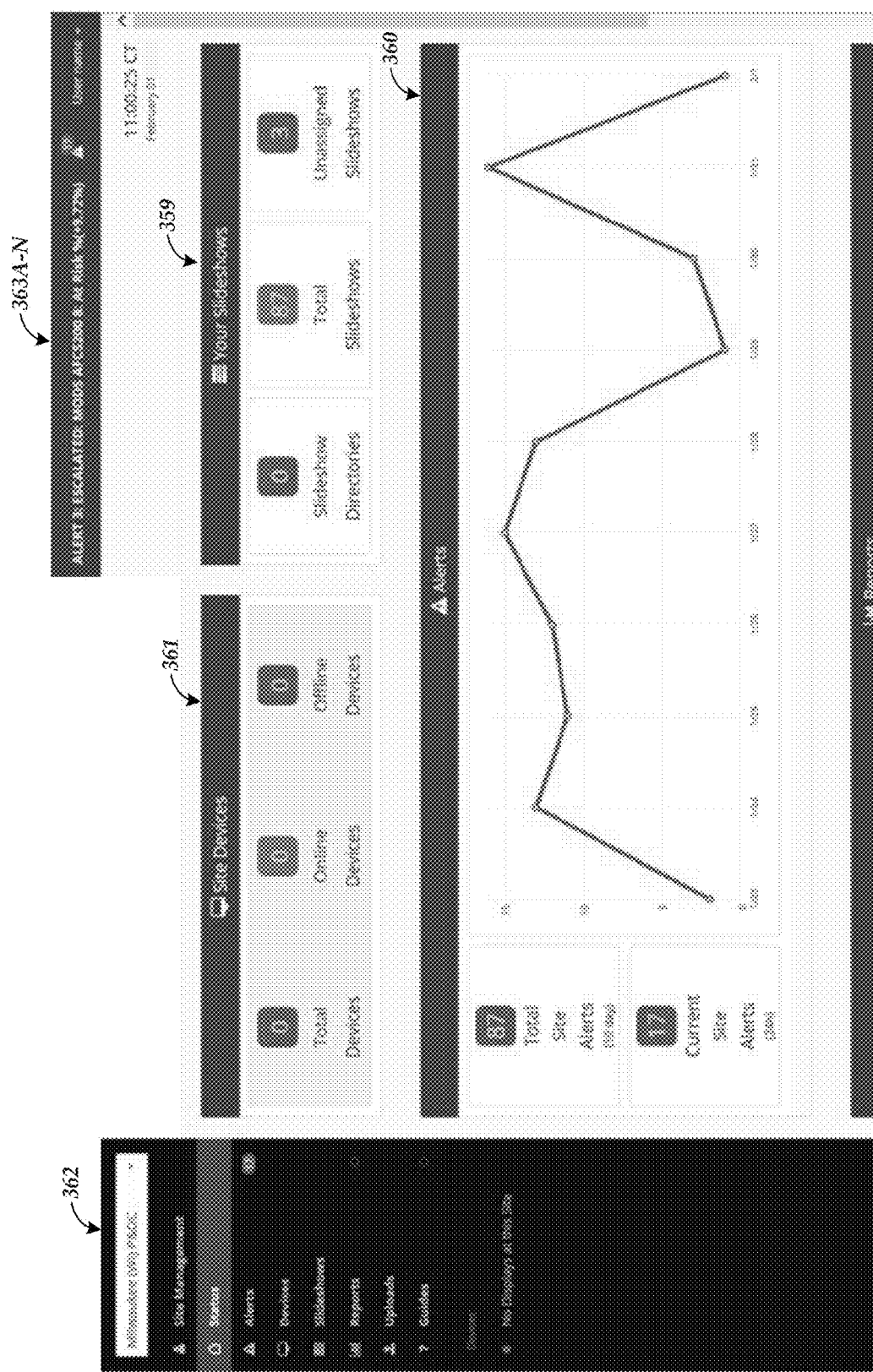

FIG. 3C illustrates an example user interface for viewing the condition of a site or facility from an end-user display 180, a user-computing device 130 or workstation 140. In the embodiment shown, the site or facility condition is in the form of a site alert, shown graphically, in this embodiment, as a line graph 360. In some embodiments, this may be the home page where every user begins when they login to use the user interface 150. The user interface of FIG. 3 may include a number of different display panels for providing information regarding equipment or system information, such as alerts 360, slideshows 359, site devices 361, menu 362, and/or alert escalation notifications 363A-N. The user interface shows a number of alerts escalated in accordance with certain embodiments of this disclosure. For example, each alert 363A-N may be displayed to a user and cycled through periodically. In a non-limiting example, the alert may be specific to a specific machine, such as an Advanced Facer-Canceler System (AFCS), shown as "Alert 3" in the top right hand side, where a user can see that the alert has been escalated and has a risk level associated with the alert.

The interface also shows the number of slideshows available for viewing, modifying, or distributing in panel 359. For example, a slideshow directory, the total number of slideshows available, or the number of slideshows that have yet to be assigned may be presented as selectable icon links (e.g., for accessing the slideshows). In addition, the interface may show the total number of devices (e.g., end-user displays 180) and may also present information on devices that are online and ones that are offline. A user may select these icons to receive more details on precisely which devices are online, for example.

The interface also shows the number of alerts over time in the line graph 360 and a report may be generated and shown based on this information (shown off the UI screen). For example, a user may gain access, based on their credentials and hierarchy status, to view the total site alerts over time (e.g., last 10 days) and the current site alerts over a smaller timeframe (e.g., last 24 hours). With this screen, the user can readily view the health of site devices, the slideshows that are available, any alerts that are associated with the site, and reports that are newly added and any data that is delayed in updating. Additionally, each of the sections shown, 359, 361, etc., may link to their associated section within the user interface 150, where more information can be viewed and control activities can be performed.

Figure 3D:
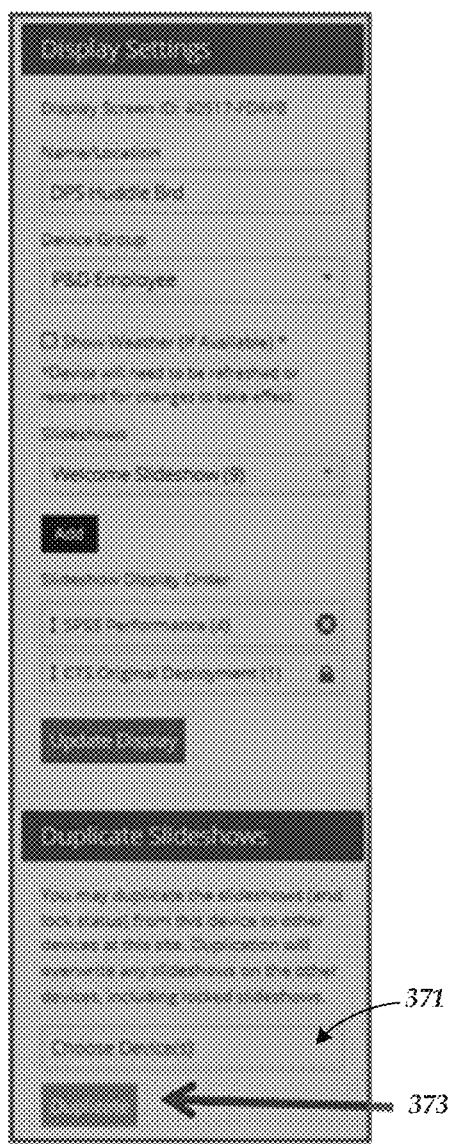

FIG. 3D shows a customization tool which allows a user to copy all of the data sets or slideshows form one device to all the others at the same facility. Where the device being copied to includes a locked or a limited access slideshow, then the source device must have at a minimum the same locked or limited access slideshows. For example, once a user has assigned one or more slideshows to a device at a site or facility, the user can replicate the same slideshows in the same order to one or more additional devices at the same site or facility by simply selecting the device(s) from the list of available devices in the device selection field 371. The user may conclude their selection by selecting the Duplicate button 373, which causes the user's selected slideshow to be duplicated on the devices selected in the device selection field 371.

Figure 3E:
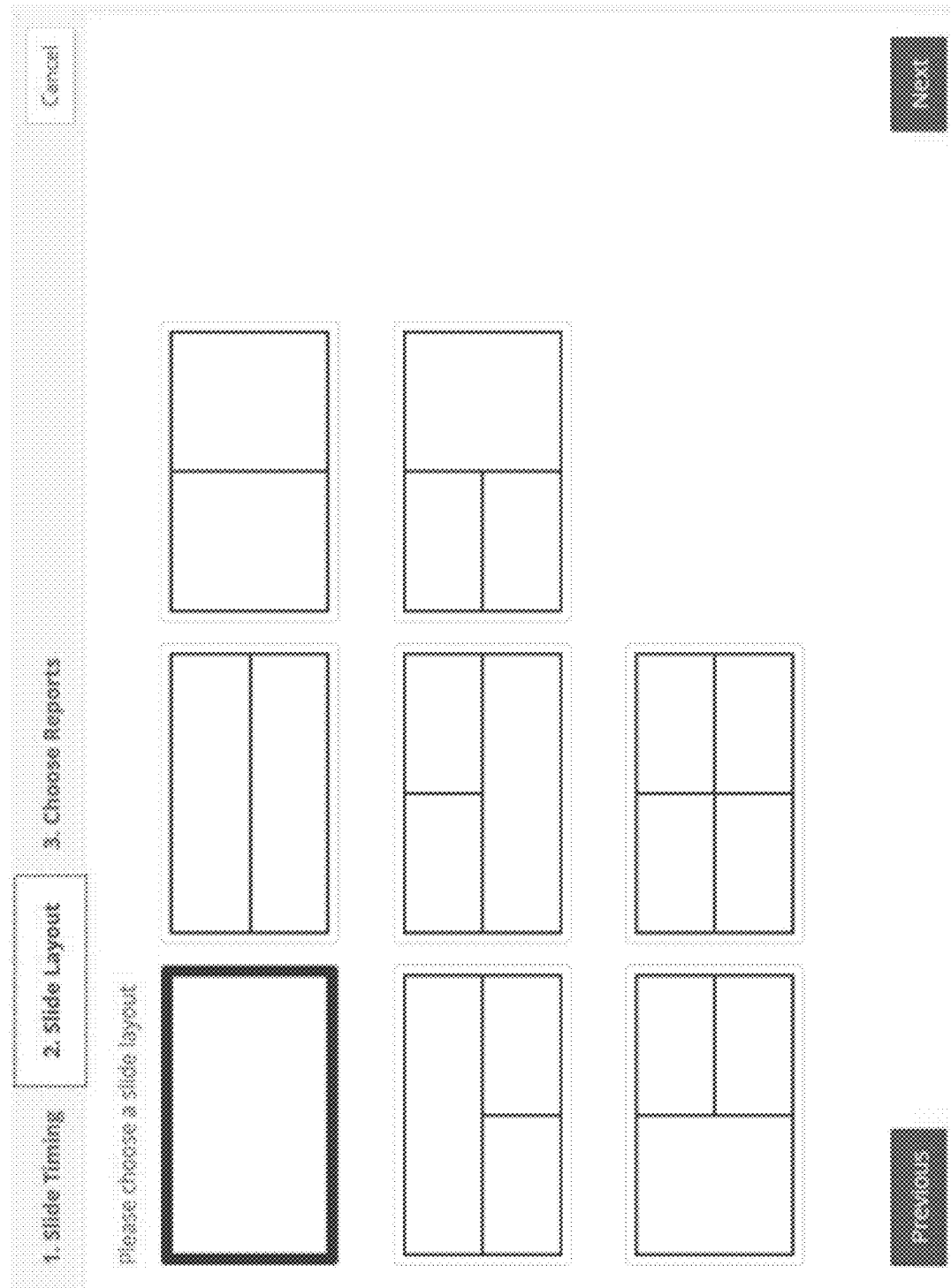

FIG. 3E shows a number of different customization tools a user may have access to in uploading data for distribution. In an example embodiment, a user may be able to customize the slide timing, the slide layout and designate what content (e.g., reports) the user would like to add to the distribution. In a non-limiting example, a user may specify how many seconds a slide should appear on the end-user display 180 screen, how often the slide should appear in the slideshow (e.g., every day of the week, specific days of the week, or within a specific date or time range), etc. For example, the slide timing can be set up for a date range according to calendar events, such as a peak season within an organization. In some embodiments, the slide timing will be preset by a user having sufficient access controls granted, such that other users who are able to upload content for distribution may not be able to change the slide timing, for example, during a peak season where a higher authority may be more interested in fixing the presentation manner of the slides and dashboards than during other seasons. For slide layout, as shown, a user may selected from a number of options for customizing a slideshow with the one or more slides that they wish to upload.

The tab shown in FIG. 3E for reports may allow a user to pull from a list of generated reports to display in one or more of the portions of the slide layout based on a layout chosen on the previous page. For example, a list of generated reports based on analytics, for example, may be presented to a user who can then drag or otherwise select the report and add it into an empty space of the slide layout. Once the user has completed the reports page, the user may click a finish button or may choose to add more slides. If the user chooses to add more slides, the previous settings in slide timing or slide layout can remain the same as the last added slide, such that a user may change or update those settings as needed for the newly added slide.

A person skilled in the art will understand that FIGS. 3A-3E provide example user interface formats and that others may be considered without departing from the spirit of the disclosed technology.

Figure 4:
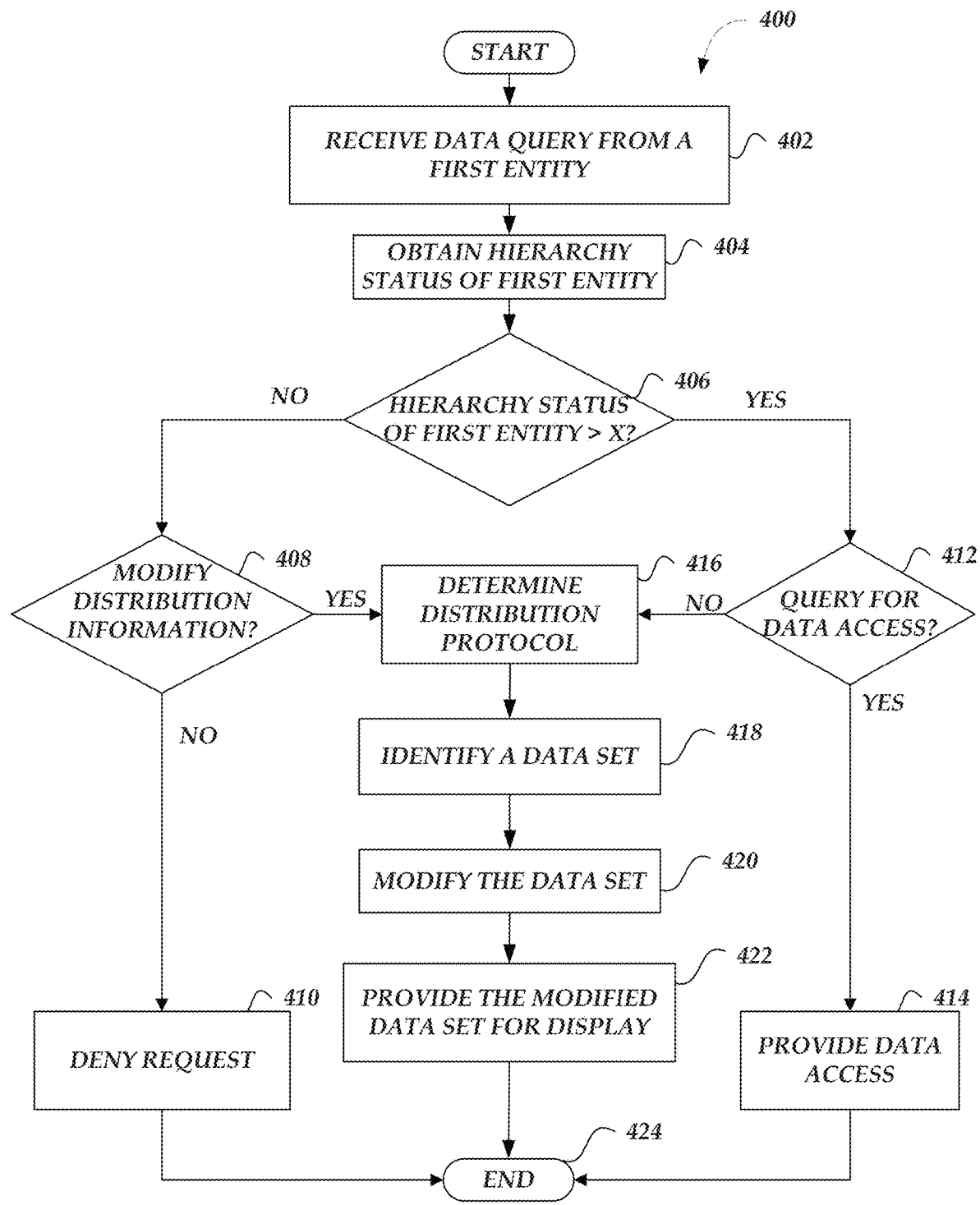
FIG. 4 is a flowchart illustrating an exemplary method of managing data distribution and access control, according to various embodiments of the present disclosure.

FIG. 4 is a flow diagram of an illustrative process 400 that may be executed by system server 102. The process 400 will be described in connection with the example system shown in FIGS. 1 and 2, and example interfaces shown in FIGS. 3A-3E. However, the examples are for illustration only, and are not intended to be limiting. In some embodiments, the process 400 or portions thereof may be used in connection with different data structures.

The process 400 shown in FIG. 4 begins at block 402. The process 400 may begin in response to an event, such as when a request is received to upload content or modify a pre-existing dataset by either adding, removing or rearranging a sequence of data items contained therein. When the process 400 is initiated, a set of executable program instructions stored on one or more non-transitory computer-readable media (e.g., hard drive, flash memory, removable media, etc.) may be loaded into memory of a system server 102. The executable instructions may then be executed by a hardware-based computer processor (e.g., a CPU) of the computing device. In some embodiments, the process 400 or portions thereof may be implemented on multiple processors, serially or in parallel.

At block 402, a data query is received from a first entity through user interface 150. The first entity may be a user computing device 130 or a workstation 140 operated by a user. In addition, user information may be associated with the data query. A data query may include a request transmitted to system server 102 to perform some action. For example, the data query may include a user requesting the system server 102 to retrieve the content currently being displayed on a particular end-user display 180. A data query may also include a request to modify data displayed on a particular end-user display 180 or a plurality of end-user displays 180. When the user requests to view or modify certain data, information about the user may be transmitted to the system server 102, such that the system server 102 may determine whether the user has proper authorization to perform the desired action. In some embodiments, system server 102 may extract user information from the data query or analyze metadata associated with the data query to determine the user information. For example, a user may need to input login credentials before transmitting the data query or the user may be sending the data query from a device associated with the user. The system server 102 may receive user-specific information with the data query such as the identity of the user, the location of the user, the relative hierarchy of the user (e.g., president, supervisor, employee, subordinate employee, customer, etc.), etc.

The data query may be received via user interface 150 as a user inputs the request or specifies the distribution method using user interface 150. A data query may refer to a user requesting a server for some information stored in a database, asking a server if it can upload information to a database, or another request to a server to perform a specified action. For example, the data query may include a request to append a specific data item, using selector 355a, to a content presentation that is currently being displayed on all outward facing end-user displays 180 in a particular district. Accordingly, the data query may be received as a result of prompts or selections made via user interface 150. For example, user interface 150 may provide fillable fields, selectable icons, dropdown menus, file upload options (e.g., "drag-and-drop" functionality from a user's desktop), etc. In some embodiments, a user may navigate through multiple pages of a user interface where each page is dedicated to soliciting specific information from the user. Accordingly, multiple data queries may be transmitted to system server 102 at various stages, while the user navigates through the user interface 150. Alternatively, data queries may be aggregated and/or reformatted before transmitting to the system server 102 or data server 120. In addition, the data query may be divided into constituent parts and sent to different servers. For example, the data query may include a request to include a data file such as an image or video, along with distribution information for the image or video. Accordingly, the distribution information itself may be transmitted to a system server 102 and the data file may be transmitted to and stored at a data server 120 separately from the distribution information transmitted to the system server 102. In addition, the data query may be processed and analyzed by system server 102 before determining that the query includes a data file for upload to data server 120.

In some embodiments, the data query may be a request to access and/or modify data stored on one or more data servers 120. In some instances, the data query comprises a request to access data stored directly on a computing system 170 connected to an end-user display 180. For example, a user may want to view, on a user computing device 130 or workstation 140, the current content being displayed or content queued for display on an end-user display 180 in real-time. In other instances, a user may only wish to view on a user computing device 130 or workstation 140 the content being displayed on a particular end-user display 180 based on the distribution information detailing the content that should be displayed on the particular display, without any desire to view the content that is actually being displayed based on an interrogation of computing system 170.

In some embodiments, the data query may include a user's request to upload data for distribution. Accordingly, the data query may include a data item such as a multimedia file or slide (audio, video, images and/or text) or an identifier (e.g., URL, hyperlink, etc.) for data stored on a data server 120, such as a slideshow or other content items that can make up a slideshow. For example, in some embodiments, a user may want to distribute information to one or more end-user displays, where the data to be distributed is at least partially associated with a URL. For example, a user may upload images to a data server 120, where the location of those images are identified by one or more URLs. In such examples, a user can edit data associated with a URL (e.g., content to be included in a slideshow) and input the URL in the user interface for distribution of the associated content.

In some embodiments, the data query may include distribution information for the data item including, for example, refresh or cycle rate, priority information, size, respective location in dataset, respective location in network of computing systems 170 and manner of distributing the data item to other entities across the network. The data query may include the distribution information or may indicate distribution information stored in data server 120. The distribution information may be the result of manual input or automatic generation.

The process moves to block 404, wherein system server 102 obtains a hierarchy status for the first entity. The hierarchy status may indicate a ranking of the entity within a group or organization. In various embodiments, the hierarchy status may include a scalar value or other alphanumeric indicator of hierarchy status of the first entity. The hierarchy status may be obtained directly from the first entity or may be derived from information provided by the first entity. For example, the first entity may transmit their name to system server 102. System server 102 may then query a data server 120 containing a hierarchy list of names within a group or organization to determine the hierarchy status of the first entity. For example, the supervisor may supervise multiple employees subordinate to him but may have several levels of the organization above him. The hierarchy list may have individual rankings for each person within an organization, a group of persons with group rankings, or some combination thereof.

The process moves to block 406, wherein a determination is made whether the first entity has a hierarchy status that is sufficient to support the data query from block 402. The threshold determination can be based on the distribution information. For example, if the entity wishes to upload content for distribution to all end-user displays 180 or device groups across all facilities within an organization, the threshold will be comparatively higher than would be for a request involving a lesser distribution of content, such as to a single facility. In another example, the threshold for distribution to certain devices may be highest when the degree of control requested is higher. For instance, if a user wishes to modify all slides showing across all facilities, then that user would need to have a hierarchy status, such as a CEO or manager of a top-tier managing branch. A machine learning ("ML") model may be deployed to determine the appropriate threshold based on the distribution information. A trained ML model can be used to determine an appropriate threshold for allowing an entity access to data on a network or to upload data for distribution. For example, a support vector machine ("SVM") can be used to determine whether an entity has sufficient hierarchy status to upload data tagged for a certain level of distribution. For brevity, these aspects may not be described with respect to each possible ML model that may be used. In practice, however, many or all of the aspects of the disclosure may apply to other ML models, including but not limited to those described herein. Examples of ML models that may be used with aspects of this disclosure include classifiers and non-classification ML models, artificial neural networks ("NNs"), linear regression models, logistic regression models, decision trees, support vector machines, Naïve or a non-Naïve Bayes network, k-nearest neighbors ("KNN") models, k-means models, clustering models, random forest models, or any combination thereof.

In other instances, the hierarchy status threshold can be based on the hierarchy status of the first entity and whether the first entity is attempting to distribute content to other entities on the same hierarchy plane or to a higher plane. For example, a company may have a headquarters, a number of regional facilities and a number of local facilities within each region, with the hierarchy status described above from ascending to descending order. In this example, if an employee or supervisor in one of the local facilities specifies, in the distribution information, a regional facility for receiving the content, system server 102 may indicate at decision block 406 that the hierarchy status is insufficient to distribute the content as such because the hierarchy status of the employee or supervisor is not high enough at the local facility level to distribute to a regional facility. Accordingly, a user should specify the distribution information, which includes what content to distribute and which end-user devices to include or exclude, based on knowledge of their own hierarchy status. In another example, if the hierarchy status of the first entity is determined to be high enough, with the entity attempting to distribute to one or more end-user devices 180 associated with an equal hierarchy plane or below, the first entity may be able to proceed with distributing content to those end-user devices 180.

If the hierarchy status of the first entity is not sufficient based on the distribution information, system server 102 may determine that the distribution information may be modified, at decision block 408, to be within the threshold limit. For example, certain devices may be excluded from the distribution list that were determined to violate the threshold limit. For example, if the user included distribution to two end-user devices 180, one being at the headquarters and the other being at a local facility, and the user only had sufficient hierarchy to distribute to the local facility, the distribution information may be modified to remove the headquarters entry from the distribution list. In other embodiments, system server 102 may determine that the distribution information cannot be modified to fit within the threshold limits for distribution from the first entity. In some embodiments, the distribution information may be specific to distributing to an entity that the first entity is not authorized to distribute to and thus, the distribution information cannot be modified or trimmed to fit within the limits for distribution. For example, if the user only specifies a headquarters facility and the user does not have the proper hierarchy to distribute to a headquarters device, then the request may simply be denied and the user may be notified that they are not authorized to proceed with the request, rather than receiving a notification that the distribution list will be trimmed or modified instead.

Alternatively, at decision block 406, if the first entity has a sufficient hierarchy status, the process proceeds to decision block 412. Likewise, if the determination at decision block 408 is that modifying the distribution information is feasible, the process proceeds to block 416.

At decision block 412, the system determines whether the data query is for accessing data or alternatively, for modifying a stored dataset or uploading a new dataset. If the query is for accessing data (e.g., viewing the content displayed on an end-user display 180 from a user computing device 130 or workstation 140), then system server 102 may allow the user to access the requested data at block 414. In some embodiments, the request to access or view the data sets (e.g., slideshows) may be inherent in a user requesting to login to use the user interface 150. For example, the user interface 150 may be configured to include a home screen that presents relevant information to a user upon logging in using user credentials, such as one of the screens of FIGS. 3A-3D. At this point, the user's home screen may auto populate with slideshows that are displaying across various facility end-user devices 180, in which case, the system server 102 may limit what is displayed to the user based on the user's hierarchy status.

If system server 102 determines the data query relates to modifying a stored data set or uploading a new data set, as opposed to simply accessing or viewing the data, the process moves to block 416, wherein system server 102 determines a distribution protocol. In some embodiments, the distribution protocol is based on the hierarchy status, the distribution information received with the data query, or both. A distribution protocol details the implementation of the distribution information including the data sets (e.g., slideshows, dashboards, etc.) that are to be modified, data sets that are to be replaced, computing devices for receiving the modified data sets for display, etc. For example, the distribution protocol may include details for integrating new content into an existing dataset or replacement of an existing data set with new content. The distribution protocol may also include instructions for fetching information from a data server 120.

The process moves to block 418, wherein system server 102 identifies a data set (e.g., slideshow, dashboard, etc.) stored on data server 120. In some embodiments, the data set may be stored on a computing system 170. For example, a data set may be downloaded from data server 120 to an individual computing system 170. The data set is identified based on the distribution protocol. The data set may be any set of data items that can be viewed on a screen concurrently or in a sequence (e.g., video, a slideshow, dashboard, etc.). For example, the slides of a slideshow may be located that are stored on data server 120. In some embodiments, the data set may comprise a current dataset being displayed on an end-user display 180.

The process moves to block 420, wherein system server 102 modifies the data set based on the distribution protocol. The modification may include replacing a data item in the data set with a new data item or integrating the new data item in the existing data set. For example, content identified by or associated with a data identifier (e.g., URL) may be included in the modified data set, where the data identifier, such as a URL, points to a location in a data server 120 for the system server 102 to retrieve the desired data item. The distribution protocol sets the cycle rate and refresh rate for a data item within a data set. For example, the distribution protocol may specify that a high priority data item should be displayed more often than a lower priority item.

At block 422, the modified data set is provided for display on an end-user display 180. The modified data set may be distributed to each computing system 170 according to the distribution protocol such that computing system 170 may feed data to the display 180. The process 400 moves to block 424 and ends.

In an illustrative example, an employee of a regional facility may want to include a breakdown of all equipment currently deemed inoperable within its own facility to append to the slideshow that is currently being displayed on end-user displays 180 throughout the same geographic area. Based on the employee's hierarchy status within the company, the employee may be able to complete this request but only for the employee's own facility and not the entire geographic area. Accordingly, system server 102 may modify the employee's request to only include distribution within the employee's own facility. The system server 102 may then access data server 120 to retrieve data from the processing equipment 125. Data server 120 may automatically pull data from processing equipment 125 periodically throughout the day, so it may not need to access the processing equipment 125 if the data it has is sufficiently current. The data server 120 may then transmit this data to system server 102. System server 102 may then access the slideshow currently being displayed on the relevant end-user display 180 and determine a slot for the processing equipment data based on the distribution information. The system server may then continue transmitting the slideshow to end-user display 180 at the employee's facility by accessing the data from data server 120, but when the newly created slot arrives, system server 120 may fetch the processing equipment data and send that data to the end-user display 180 for display as part of the current slideshow. The data server 120 may then continue pulling data from the processing equipment 125 automatically and sending the data to system server 102 as requested.

In another example, a user may transmit a request (e.g., a data query) from user computing device 130 or workstation 140 to system server 102 via user interface 150 to display general equipment diagnostic data on an end-user display 180. System server 102 may then query data server 120 for the specific data, which it may already have or it may need to request that data from the specific processing equipment 125. The processing equipment 125 may send the diagnostic data to data server 120, which may then transmit to system server 102. System server 102 may then send the data to computing system 170 for final display at end-user display 180.

Figure 5:
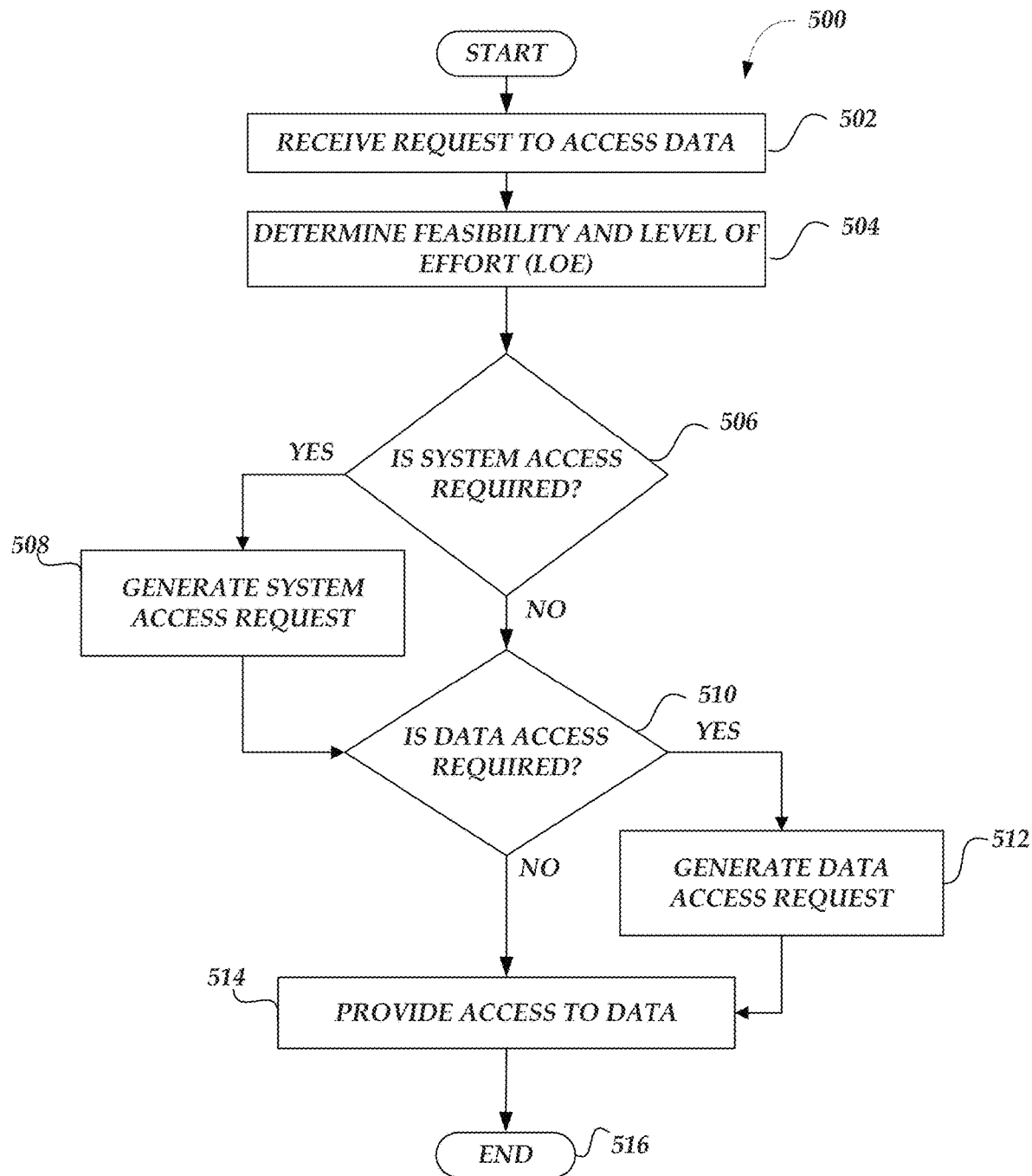
FIG. 5 is a flowchart illustrating an exemplary method of providing system and data access, according to various embodiments of the present disclosure.

FIG. 5 is a flow diagram of an illustrative process 500 that may be executed by system server 102. The process 500 will be described in connection with the example system shown in FIG. 1, and example interfaces shown in FIGS. 3A-3E. However, the examples are for illustration only, and are not intended to be limiting. In some embodiments, the process 500 or portions thereof may be used in connection with different data structures.

The process 500 shown in FIG. 5 begins at block 502. The process 500 may begin in response to an event, such as when a request is received to modify a data set with a large data file or where a data set is slated for distribution to a disparate set of end-user displays 180. When the process 500 is initiated, a set of executable program instructions stored on one or more non-transitory computer-readable media (e.g., hard drive, flash memory, removable media, etc.) may be loaded into memory of a system server 102. The executable instructions may then be executed by a hardware-based computer processor (e.g., a CPU) of the computing device. In some embodiments, the process 500 or portions thereof may be implemented on multiple processors, serially or in parallel.

At block 502, system server 102 receives a request to access data as described above with reference to block 402 of FIG. 4. The process moves to block 504, wherein system server 102 may determine the feasibility and level of effort (LOE) in providing access to the requesting entity. This feasibility and LOE calculation may be automatically determined based on machine learning algorithms or settings defined by a user. For example, system server 102 may determine that a request to view content displayed on each monitor within a large organization on a single end computing device 130 may not be feasible. In this case, system server 102 may determine that the end computing device 130 may not be able to handle the request (e.g., size of the phone screen may be too small, or processing requirements may be too great, the size of a file upload may too large, etc.). Thus, system server 102 may determine that the request is not feasible or that the LOE is too great and may deny the request or ask the user to try again.

The process moves to block 506, wherein system server 102 may determine based on the request whether system access is required. System access may be required if the data requested resides on a data server 120 controlled by system server 102. Otherwise, if the data is not part of the data server 120, then system server 102 may determine that system access is not required. If yes, system server 102 generates a system access request at block 508. At block 510, system server 102 may determine based on the request whether data access is required. If yes, system server 102 generates a data access request at block 512. The data access request may be an instruction to the data server 120 to access a specific file or multiple files. Accordingly, the system server 102 may need to be granted access before it can access the files of the data server 120. At block 514, system server 102 provides the requesting entity with access to the data. At block 516, the process ends.

Figure 6:
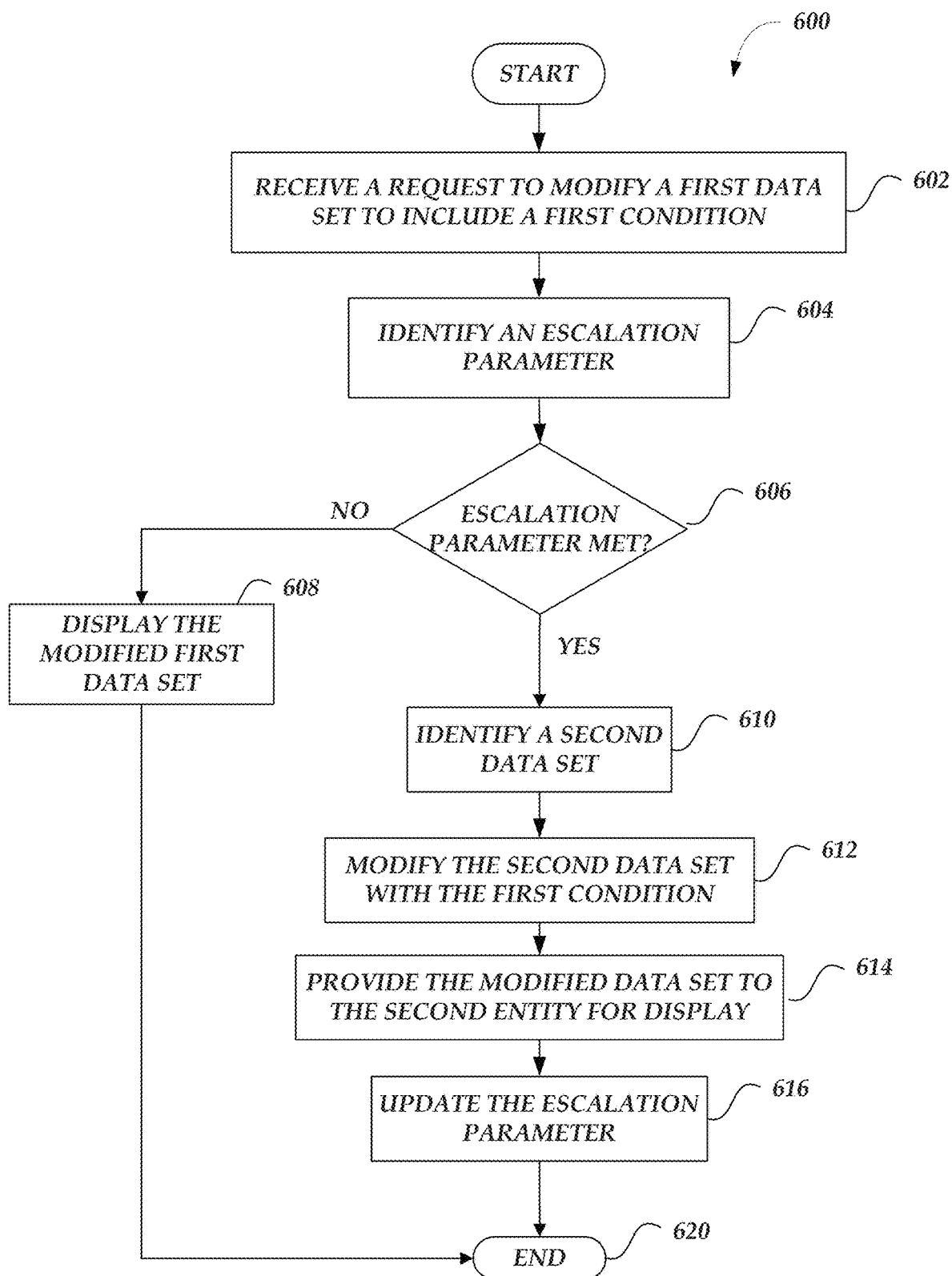
FIG. 6 is a flowchart illustrating an exemplary method of an escalation protocol, according to various embodiments of the present disclosure.

FIG. 6 is a flow diagram of an illustrative process 600 that may be executed by system server 102. The process 600 will be described in connection with the example system shown in FIG. 1, and example interfaces shown in FIGS. 3A-3E. However, the examples are for illustration only, and are not intended to be limiting. In some embodiments, the process 600 or portions thereof may be used in connection with different data structures.

The process 600 shown in FIG. 6 begins at block 602. The process 600 may begin in response to an event, such as when a request is received to modify a data set to include a first condition (e.g., an equipment alert or other health condition). When the process 600 is initiated, a set of executable program instructions stored on one or more non-transitory computer-readable media (e.g., hard drive, flash memory, removable media, etc.) may be loaded into memory of a system server 102. The executable instructions may then be executed by a hardware-based computer processor (e.g., a CPU) of the computing device. In some embodiments, the process 600 or portions thereof may be implemented on multiple processors, serially or in parallel.

At block 602, system server 102 receives a request to modify a data set to include a first condition. In some embodiments, a condition comprises a status or alert associated with a system. For example, an alert may be added to a data set as a result of a machine in a factory going offline for an error or for maintenance. In some instances, these alerts may be automatically updated, or generated in the first instance, with data received from directly from processing equipment 125 or data server 120. The condition may include details about the condition (e.g., machine X is nonoperational), a priority level of the condition, a passage of time the condition has been present, the number of times an alert has been cycled through as part of the modified data set, an alert threshold associated with the condition, a ratio of systems with a poor health condition and those with an acceptable health condition, etc. For example, a tracker on a service vehicle may indicate that the service vehicle has been stationary for a prolonged period of time which may trigger an alert that the vehicle or vehicle operator may require extra attention. In such an example, the condition could be an alert with the amount of time the vehicle has been stationary.

Process 600 moves to block 604, wherein system server 102 identifies an escalation parameter. The escalation parameter may include a threshold based on the different conditions described above. For example, the threshold for the escalation parameter may specify a certain number of days that a piece of equipment has been out of commission or otherwise inoperable. In some embodiments, an escalation parameter may be predetermined by a user via a user interface 150. The escalation parameter may vary for a set or group of conditions. For example, a user with an approved hierarchy status may set the escalation parameter for a specific condition of a machine in a factory being offline to X number of weeks. Similarly to the hierarchy threshold discussion above, the escalation parameter may be predetermined by a system user or set by a ML model.

Process 600 moves to decision block 606, wherein the system server 102 determines whether the escalation parameter has been met. For example, if the escalation parameter is in terms of a number of weeks, and an alert has been active for the number of weeks specified, the escalation parameter is satisfied and the process proceeds to block 610. Otherwise, the process may advance to block 608. At block 608, system server 102 may display the first data set modified with the first condition on an end-user display device according to relevant distribution information received with the original request. For example, a user may request that the condition be displayed as a slide or as part of a dashboard display on an end-user display 180 device in an employee facing area within the organization. If the user meets specific criteria for modifying the data set with the condition, then the modified data set will display including the condition on the specified end-user display device 180. In some embodiments, the modified first data set may be displayed at the current facility until the escalation parameter is met, and may be discontinued or may continue to be displayed at the current facility after the escalation parameter is met and the condition is escalated.

Process 600 moves to block 610, wherein a second data set is identified on the network. The second data set may be a data set currently being displayed at a facility directly above the current facility on the hierarchy status. For example, if the first data set is displayed at a local facility, system server 102 may identify a second data set associated with or displayed at a facility with superior hierarchy level. In a non-limiting example, the local facility may report to a district facility, in which case the second data set may be identified in association with the district facility.

At block 612, the identified second data set may be modified with the first condition. System server 102 may determine that if the escalation parameter is met, the condition should be sent to a higher-up organization in the hierarchical structure, such that the affected equipment receives more visibility. Accordingly, a slideshow may be currently presented on an end-user display 180 at the higher-up organization. If the escalation parameter is met, then the currently presented slideshow (e.g., the second data set) may be modified such that it now includes a slot for the escalated condition. Modification of the data set may comprise updating the instructions for retrieving data from the data server 120, such that at the designated moment, system server 102 fetches the condition information and then proceeds to fetch the other slide information for the remainder of the slideshow. In some embodiments, modifying the second data set comprises adding the first condition to the data set or updating a current condition in the second data set.

At block 616, the escalation parameter may be updated. For example, if the condition is in terms of time or percentage, the time or percentage parameter may be reduced or lengthened as a result of the condition being escalated to a second data set.

Figure 7:
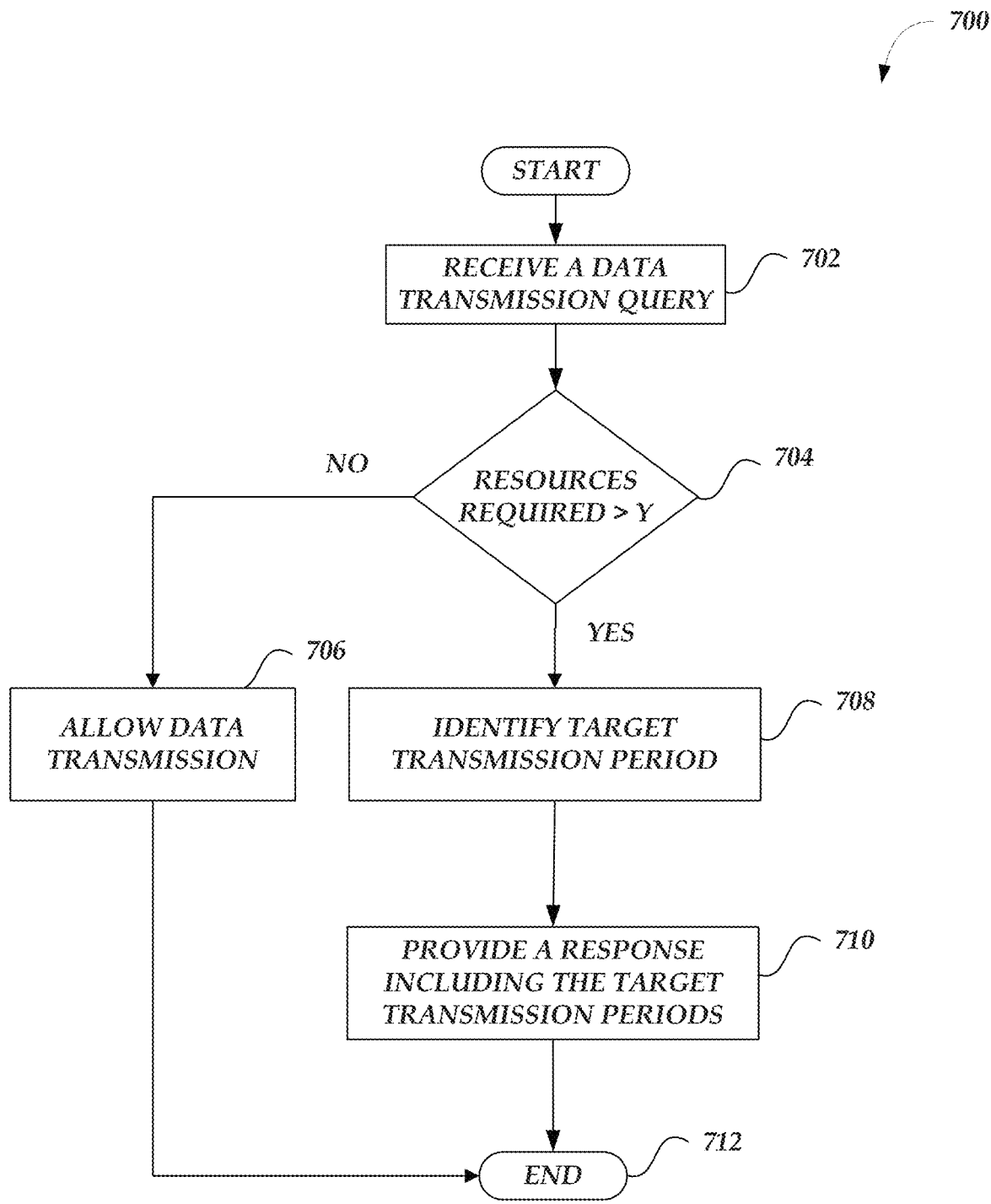
FIG. 7 is a flowchart illustrating an exemplary method of determining a target transmission period, according to various embodiments of the present disclosure.

FIG. 7 is a flow diagram of an illustrative process 700 that may be executed by system server 102. The process 700 will be described in connection with the example system shown in FIG. 1. However, the examples are for illustration only, and are not intended to be limiting. In some embodiments, the process 700 or portions thereof may be used in connection with different data structures.

The process 700 shown in FIG. 7 begins at block 702. The process 700 may begin in response to an event, such as when a request is received to modify a data set to include a first condition. When the process 700 is initiated, a set of executable program instructions stored on one or more non-transitory computer-readable media (e.g., hard drive, flash memory, removable media, etc.) may be loaded into memory of a system server 102. The executable instructions may then be executed by a hardware-based computer processor (e.g., a CPU) of the computing device. In some embodiments, the process 700 or portions thereof may be implemented on multiple processors, serially or in parallel.

At block 702, a data transmission query is received. The data transmission query may be received by a receiving entity, such as computing system 170 or system server 102. The data transmission query may be transmitted by a transmitting entity, such as user computing devices 130, workstations 140, or system server 102. Because system server 102 communications information between the various systems, devices and servers based on input via the user interface 150, system server 102 may be both a transmitting entity and a receiving entity. The data transmission query may be associated with a data item (e.g., audio, video, text, images, etc.) or may be associated with a data set (e.g., a slideshow of images, video montage, video with audio, etc.).

Process 700 moves to block 704, wherein the system server 102 may determine, based on the data transmission query and/or the data item or data set associated with the transmission, an amount of resources required to support the data transmission. The amount of resources may be related to the amount of bandwidth required, the size of the data item or data set, etc. If the resources required to support the data transmission are greater than a predetermined threshold, then the process flow proceeds to block 708. Otherwise, the receiving entity and transmitting entity may be authorized to proceed with the data transmission at block 706. In some embodiments, a predetermined file type may cause system server 102 to automatically indicate the resource as a high resource item and thus, requiring the process flow to proceed to block 708. For example, identification of a file extension indicating a video file type (e.g., Moving Picture Experts Group-4 ("MP4"), etc.) may cause the file to be flagged for processing at block 708.

Process 700 moves to block 708, wherein the system server 102 may identify a target transmission period. In some embodiments, a target transmission period comprises one or more timeframes. The target transmission period may be based on the resources or file type identified at block 704. In addition, the target transmission period may be based on historical or statistical data. For example, system server 102 may determine based on historical and/or statistical data that certain time frames during the day or week are better suited for transmitting large data files (e.g., non-peak hours where data traffic is low) and thus, should be identified as target transmission periods based on expected low data traffic or other relatively high resource availability. In addition, the system server 102 may deploy a machine learning model to determine the target transmission periods based on the data available to the system. In some instances, system server 102 may receive the data item from a computing device, determine that the data item is a high resource item, but may nevertheless store the data item in data server 120 immediately upon receipt of the query, and then determine a target transmission period for retransmitting the data from data server 120 to computing system 170. In some embodiments, a user may be able to override a delayed transmission. For example, a user may indicate that the data item or set is a high priority item or otherwise indicate that the data should be transmitted immediately.

Process 700 moves to block 710, wherein the system server 102 may provide a response to the entity attempting to transmit the data including the target transmission period. The transmitting entity may then delay transmission of the data item until the target transmission period. The transmission may be automatically scheduled such that the data item is transmitted automatically during the target transmission period. Alternatively, the data item may be temporarily stored in a data server 120 and then transmitted from data server 120 to the receiving entity (e.g., user computing device 130, workstation 140, computing system 170, end-user display 180) during the target transmission period.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the disclosed technology should not be taken to imply that the terminology is being re-defined herein to be restricted to including any specific characteristics of the features or aspects of the technology with which that terminology is associated.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458). The various embodiments of interactive and dynamic user interfaces of the present disclosure are the result of significant research, development, improvement, iteration, and testing and in some embodiments, provide a particular manner of summarizing and presenting information in electronic devices. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized presentation of item specific information in a number of different locations to a user and may enable a user to more quickly access, navigate, assess, and utilize such information than with previous systems which can be slow, complex and/or difficult to learn, particularly to novice users.

In accordance with the present disclosure, users are allowed to more easily see, access and/or specify the most relevant data with respect to distribution and hierarchy rules. Further, the interactive and dynamic user interfaces described herein are enabled by innovations in efficient interactions between the user interfaces and underlying systems and components. For example, disclosed herein are improved methods of receiving user inputs, extracting useful information from the user input, correlating such information across various different data structures, delivering the information to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Control algorithms and user interfaces of the type disclosed herein significantly reduce this problem, allowing users to identify data sets of interest with fewer steps and with higher control such that users cannot access data without being properly authorized and such that only the most relevant information is displayed to the right audience. Beneficially, programmatically storing data in a data server for access from a display device, allowing a user to specify, via a user interface, data from the data server or to be stored in the data server, and automatically distributing the information to be seamlessly integrated into existing data sets, rather than requiring the system to duplicate effort in storing multiple versions of the same data item in a data server or computing system, when the data item is slated to be displayed on multiple display devices across an organization.

Various embodiments of the present disclosure provide improvements to various technologies and technological fields. For example, existing systems for content management and data distribution are limited in various ways (e.g., manual review is slow, costly, inaccessible from a user's perspective and less accurate; data is too voluminous or esoteric; etc.), and various embodiments of the disclosure provide significant improvements over such technology. Additionally, various embodiments of the present disclosure are inextricably tied to computer technology. In particular, various embodiments rely on identification and manipulation of specific data items within potentially disparate data structures. In addition, various embodiments, rely on detection of user inputs via graphical user interfaces, calculation of updates to displayed electronic data based on those user inputs, automatic processing of related electronic data, and presentation of updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data. In addition, a specific manner of displaying a limited data set to a user viewing a display is disclosed that results in an increased efficiency in displaying and allowing user interactions with multiple data sets displayed on various display devices, such as allowing the user to choose multiple locations to preview the data associated with a specific location.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the disclosed technology. This disclosed technology is susceptible to modifications in the methods and materials, as well as alterations in the systems and equipment. Such modifications will become apparent to those skilled in the art from a consideration of this disclosure or practice of the technology disclosed herein. Consequently, it is not intended that the disclosed technology be limited to the specific embodiments disclosed herein, but that it cover all modifications and alternatives coming within the true scope and spirit of the disclosed technology.

What is claimed is:

1. A system for presenting content in one or more facilities, the system comprising:
    a first display located at a first facility;
    a plurality of second displays located at a plurality of second facilities, the first display and the plurality of second displays each configured to display data sets comprising one or more data items; and
    at least one computing device associated with the first facility and configured to transmit a request comprising an operational status indicator identifying a piece of processing equipment located at the first facility that is nonoperational; and
    a system server comprising one or more processors and memory storing computer-executable instructions that, when executed by the one or more processors, cause the one or more processors to at least:
        receive the request from the at least one computing device;
        determine an escalation parameter corresponding to the operational status indicator, the escalation parameter comprising a threshold time period determined based at least in part on an identity or type of the piece of processing equipment;
        modify a first data set displayed on the first display based on the operational status indicator; and
        in response to determining that the piece of processing equipment has been nonoperational for at least the threshold time period:
            select, from the plurality of second displays, a second display based on the selected second display being associated with a higher organizational hierarchy status relative to the first display;
            identify a second data set displayed on the selected second display; and
            modify the second data set to cause the selected second display to display the operational status indicator.

2. The system of claim 1, wherein the operational status indicator comprises an indication of a health or operational status of the piece of equipment located at the first facility.

3. The system of claim 2, wherein the first facility is a facility of a distribution network and wherein the piece of equipment comprises item processing equipment.

4. The system of claim 2, wherein the at least one computing device is configured to generate the request automatically based on data received from circuitry associated with the piece of equipment.

5. The system of claim 1, wherein the request further comprises a condition time period for which the piece of processing equipment has already been nonoperational at the time of the request.

6. The system of claim 5, wherein the instructions further cause the one or more processors to determine that the threshold time period has elapsed based on a beginning of the condition time period.

7. The system of claim 1, wherein modifying the first data set comprises at least one of adding the operational status indicator to the first data set or adding an alert to the first data set based on the operational status indicator.

8. The system of claim 1, wherein the one or more processors identify the selected second display based at least in part on the second facility being directly above the first facility within an organizational hierarchy.

9. The system of claim 1, wherein the instructions further cause the one or more processors to modify the escalation parameter by increasing or decreasing the threshold time period after the second data set is modified.

10. The system of claim 9, wherein the instructions further cause the one or more processors to escalate the condition to a third facility having a higher hierarchy status relative to the second facility when the increased or decreased threshold time period elapses following the modification of the escalation parameter.

11. A method of monitoring equipment status in a distributed environment, the method comprising:
receiving, at a system server, a request from a first computing device associated with a first facility, the request comprising an operational status indicator identifying a piece of processing equipment located at the first facility that is nonoperational;
determining an escalation parameter corresponding to the operational status indicator, the escalation parameter comprising a threshold time period determined based at least in part on an identify or type of the piece of processing equipment;
modifying a first data set displayed on a first display at the first facility based on the operational status indicator; and
in response to determining that the piece of processing equipment has been nonoperational for at least the threshold time period:
selecting, from a plurality of second displays located at a plurality of second facilities, a second display based on the selected second display being associated with a higher organizational hierarchy status relative to the first display;
identifying a second data set displayed on the selected second display; and
modifying the second data set to cause the selected second display to display the operational status indicator.

12. The method of claim 11, wherein the operational status indicator comprises an indication of a health or operational status of the piece of equipment located at the first facility.

13. The method of claim 12, wherein the first facility is a facility of a distribution network and wherein the piece of equipment comprises item processing equipment.

14. The method of claim 12, wherein the first computing device is configured to generate the request automatically based on data received from circuitry associated with the piece of equipment.

15. The method of claim 11, wherein the request further comprises a condition time period for which the piece of processing equipment has already been nonoperational at the time of the request.

16. The method of claim 15, wherein the threshold time period is determined to have elapsed based on a beginning of the condition time period.

17. The method of claim 11, wherein modifying the first data set comprises at least one of adding the operational status indicator to the first data set or adding an alert to the first data set based on the operational status indicator.

18. The method of claim 11, wherein the selected second display is identified based at least in part on the second facility being directly above the first facility within an organizational hierarchy.

19. The method of claim 11, further comprising modifying the escalation parameter by increasing or decreasing the threshold time period after modifying the second data set.

20. The method of claim 19, further comprising escalating the condition to a third facility having a higher hierarchy status relative to the second facility when the increased or decreased threshold time period elapses following the modification of the escalation parameter.

* * * * *